US012608072B2

(12) United States Patent
Liu et al.

(10) Patent No.: US 12,608,072 B2
(45) Date of Patent: Apr. 21, 2026

(54) POWER CONSUMPTION CONTROL METHOD AND ELECTRONIC DEVICE

(71) Applicant: HONOR DEVICE CO., LTD., Shenzhen (CN)

(72) Inventors: Dong Liu, Shenzhen (CN); Guanghua Zhong, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 82 days.

(21) Appl. No.: 18/711,154

(22) PCT Filed: Apr. 25, 2023

(86) PCT No.: PCT/CN2023/090703
§ 371 (c)(1),
(2) Date: May 17, 2024

(87) PCT Pub. No.: WO2023/246290
PCT Pub. Date: Dec. 28, 2023

(65) Prior Publication Data
US 2025/0004532 A1     Jan. 2, 2025

(30) Foreign Application Priority Data

Jun. 23, 2022     (CN) .......................... 202210727997.5

(51) Int. Cl.
*G06F 1/3234* (2019.01)
*G06F 3/04883* (2022.01)
*G06F 3/14* (2006.01)

(52) U.S. Cl.
CPC ........ *G06F 1/3265* (2013.01); *G06F 3/04883* (2013.01); *G06F 3/1454* (2013.01)

(58) Field of Classification Search
CPC .. G06F 1/3218; G06F 1/3265; G06F 3/04883; G06F 3/1454; H04M 1/72412;
(Continued)

(56) References Cited

U.S. PATENT DOCUMENTS 11,862,125 B2     1/2024  Lee et al.
12,039,901 B2     7/2024  Gu et al.
(Continued)

FOREIGN PATENT DOCUMENTS

CN            101004632 A      7/2007
CN            111816139 A     10/2020
(Continued)

*Primary Examiner* — Terrell S Johnson

(57) ABSTRACT

Embodiments of this application disclose a power consumption control method and an electronic device, and relate to the field of electronic technologies, to reduce power consumption of an electronic device such as a mobile phone when a user performs screen projection by using the electronic device. A specific solution is as follows: An electronic device projects a screen by using a screen projection application; the electronic device displays a first interface, where the first interface includes a to-be-displayed area, and a working mode of the screen of the electronic device is a normal mode; and the electronic device adjusts the working mode of the screen to an always on display AOD mode when a ratio of the to-be-displayed area to all display areas of the screen is less than a preset threshold.

13 Claims, 7 Drawing Sheets

(58) Field of Classification Search
CPC . H04M 1/72454; H04W 52/027; Y02D 30/70
See application file for complete search history.

(56) References Cited

U.S. PATENT DOCUMENTS

| | | | | |
|---|---|---|---|---|
| 2007/0126729 | A1 | 6/2007 | Yoon et al. | |
| 2012/0306737 | A1* | 12/2012 | Sweet .................. | G06F 3/1454 |
| | | | | 345/156 |
| 2018/0275948 | A1* | 9/2018 | Xu ........................ | G06F 3/1454 |
| 2019/0156785 | A1 | 5/2019 | Marchya et al. | |
| 2021/0109623 | A1 | 4/2021 | Kon et al. | |
| 2022/0189408 | A1* | 6/2022 | Jo ........................ | G09G 3/3275 |
| 2025/0004532 | A1* | 1/2025 | Liu ..................... | G06F 3/04883 |

FOREIGN PATENT DOCUMENTS

| | | | |
|---|---|---|---|
| CN | 112114767 | A | 12/2020 |
| CN | 112333326 | A | 2/2021 |
| CN | 113032065 | A | 6/2021 |
| CN | 113485667 | A | 10/2021 |
| CN | 113867663 | A | 12/2021 |
| CN | 114071047 | A | 2/2022 |
| WO | 2021233218 | A1 | 11/2021 |
| WO | 2022030996 | A1 | 2/2022 |
| WO | 2022077503 | A1 | 4/2022 |

* cited by examiner

An electronic device projects a screen

The electronic device displays a static interface and a prompt window

A SOC of the electronic device performs layer identification

The SOC of the electronic device determines that a top layer is a specific layer The SOC of the electronic device sends a refresh rate adjustment notification to a screen IC The screen IC of the electronic device adjusts a refresh rate to a refresh rate corresponding to an AOD mode The SOC of the electronic device sends a working mode adjustment notification to the screen IC The screen IC of the electronic device adjusts a working mode to the AOD mode Time

FIG. 5

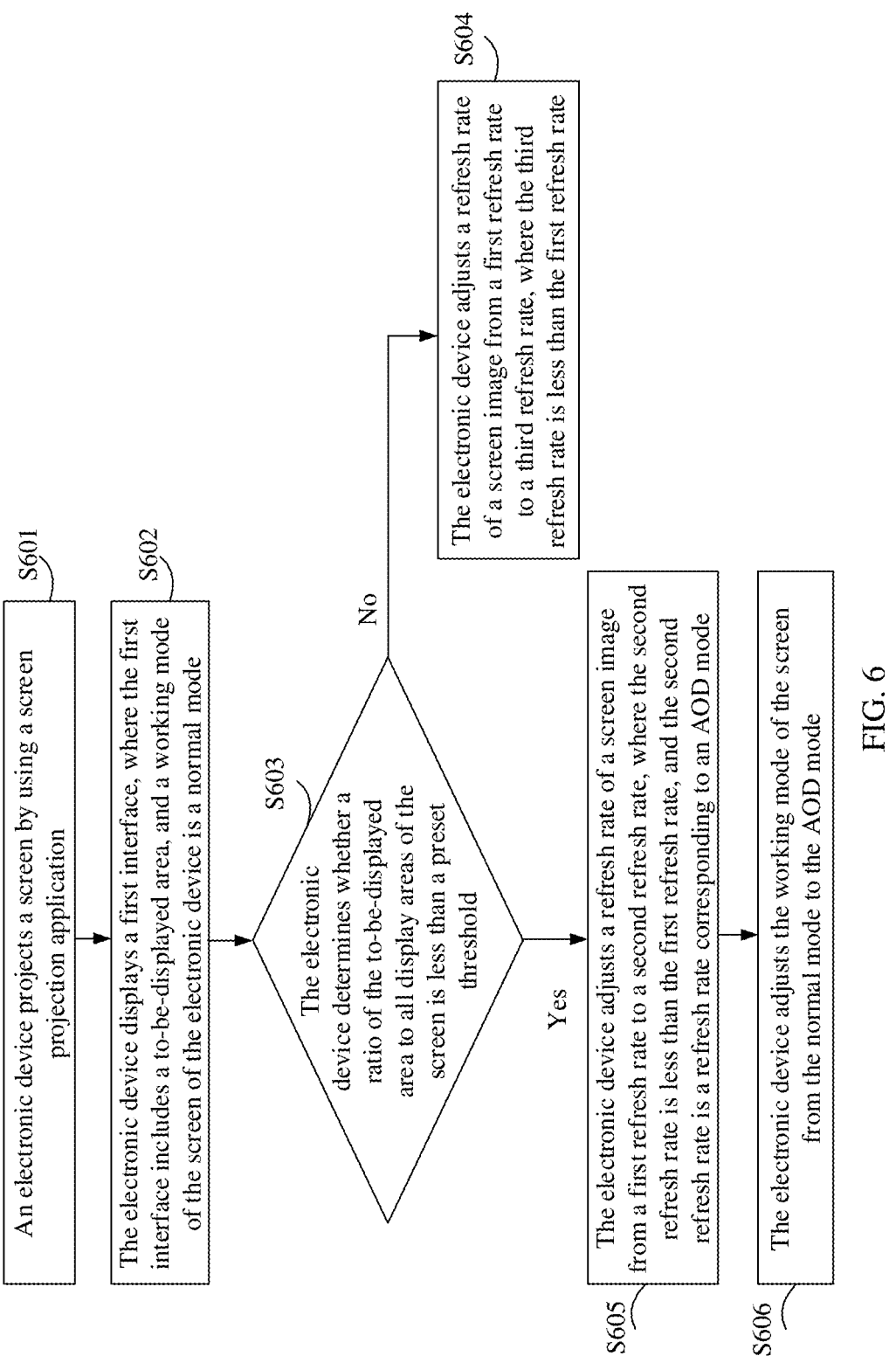

S601

An electronic device projects a screen by using a screen projection application

S602

The electronic device displays a first interface, where the first interface includes a to-be-displayed area, and a working mode of the screen of the electronic device is a normal mode

S603

The electronic device determines whether a ratio of the to-be-displayed area to all display areas of the screen is less than a preset threshold No

S604

The electronic device adjusts a refresh rate of a screen image from a first refresh rate to a third refresh rate, where the third refresh rate is less than the first refresh rate Yes

S605

The electronic device adjusts a refresh rate of a screen image from a first refresh rate to a second refresh rate, where the second refresh rate is less than the first refresh rate, and the second refresh rate is a refresh rate corresponding to an AOD mode

S606

The electronic device adjusts the working mode of the screen from the normal mode to the AOD mode

FIG. 6

POWER CONSUMPTION CONTROL METHOD AND ELECTRONIC DEVICE

CROSS-REFERENCE TO RELATED APPLICATIONS

This application is a National Stage of International Application No. PCT/CN2023/090703, filed on Apr. 25, 2023, which claims priority to Chinese Patent Application No. 202210727997.5, filed on Jun. 23, 2022, both of which are hereby incorporated by reference in their entireties.

TECHNICAL FIELD

Embodiments of this application relate to the field of electronic technologies, and in particular, to a power consumption control method and an electronic device.

BACKGROUND

With popularization of intelligent devices and development of communication technologies, it becomes increasingly common in daily life to project a screen of one electronic device (such as a mobile phone) onto a screen of another electronic device (such as a notebook computer) for display. For example, a user may project, by using a Your-Phone screen projection function on a mobile phone, content displayed on a screen of the mobile phone onto a screen of a notebook computer for display. When the mobile phone projects the screen by using the YourPhone screen projection function, the screen of the mobile phone usually displays a specific static interface, such as a pure black interface.

When the mobile phone projects the screen by using the YourPhone screen projection function, a refresh rate of the screen of the mobile phone is usually relatively high. However, when the screen of the mobile phone displays the specific static interface, the screen of the mobile phone does not require a relatively high refresh rate. This causes relatively high power consumption of the mobile phone.

SUMMARY

Embodiments of this application provide a power consumption control method and an electronic device, to reduce power consumption of an electronic device such as a mobile phone when a user performs screen projection by using the electronic device.

According to a first aspect, an embodiment of this application provides a power consumption control method, applied to an electronic device. The electronic device may include a screen projection application, and the power consumption control method may include: The electronic device projects a screen by using the screen projection application; the electronic device displays a first interface, where the first interface includes a to-be-displayed area, a working mode of the screen of the electronic device is a normal mode, and when the working mode of the screen is the normal mode, the electronic device supplies power to all display areas of the screen, and a refresh rate of a screen image on the electronic device is a first refresh rate; and the electronic device adjusts the working mode of the screen to an always on display AOD mode when a ratio of the to-be-displayed area to all the display areas of the screen is less than a preset threshold, where when the working mode of the screen is the AOD mode, the electronic device supplies power to the to-be-displayed area, the refresh rate of the screen image on the electronic device is a second refresh rate, and the second refresh rate is less than the first refresh rate.

Based on the power consumption control method described in the first aspect, when the electronic device projects the screen by using the screen projection application, the electronic device displays the first interface, and the electronic device may determine whether the ratio of the to-be-displayed area in the first interface to all the display areas of the screen is less than the preset threshold. When the electronic device determines that the ratio of the to-be-displayed area in the first interface to all the display areas of the screen is less than the preset threshold, the electronic device may adjust the working mode of the screen from the normal mode to the always on display AOD mode. Because the refresh rate used for the screen image when the working mode of the screen is the always on display AOD mode is less than the refresh rate used for the screen image when the working mode of the screen is the normal mode, in the solution of this application, the refresh rate of the screen image on the electronic device can be reduced when the electronic device projects the screen by using the screen projection application, thereby reducing power consumption of the electronic device.

In addition, when the working mode of the screen is the always on display AOD mode and the ratio of the to-be-displayed area in the first interface to all the display areas of the screen is less than the preset threshold, the electronic device may supply power to the to-be-displayed area in the first interface, and does not need to supply power to all the display areas of the screen. Therefore, in the solution of this application, when the electronic device projects the screen by using the screen projection application, the electronic device may adjust a power supply manner of the screen, that is, the electronic device may reduce current for supplying power to the screen, thereby further reducing power consumption of the electronic device.

With reference to the first aspect, in a possible implementation, that the electronic device adjusts the working mode of the screen to an always on display AOD mode may include: The electronic device adjusts the refresh rate of the screen image from the first refresh rate to the second refresh rate; and the electronic device adjusts the working mode of the screen from the normal mode to the AOD mode.

Based on the possible implementation, when the electronic device adjusts the working mode of the screen to the always on display AOD mode, the electronic device may adjust the refresh rate of the screen image to a relatively low refresh rate, and the electronic device may further adjust the working mode of the screen from the normal mode to the AOD mode, thereby reducing power consumption of the electronic device.

With reference to the first aspect, in a possible implementation, when the working mode of the screen is the normal mode, a frame drawing rate of the screen image on the electronic device is a first frame drawing rate, where the first refresh rate is greater than the first frame drawing rate, and the second refresh rate is the same as the first frame drawing rate.

Based on the possible implementation, when the electronic device adjusts the working mode of the screen to the always on display AOD mode, the electronic device may adjust the refresh rate of the screen image to the frame drawing rate of the screen image, thereby further reducing power consumption of the electronic device without affecting display.

With reference to the first aspect, in a possible implementation, the electronic device may include a system on chip SOC and a screen integrated circuit IC, and that the electronic device adjusts the refresh rate of the screen image from the first refresh rate to the second refresh rate may include: The SOC sends a first refresh rate adjustment notification to the screen IC, where the first refresh rate adjustment notification includes the second refresh rate; the screen IC receives the first refresh rate adjustment notification, and adjusts the refresh rate of the screen image from the first refresh rate to the second refresh rate based on the first refresh rate adjustment notification; the SOC sends a working mode adjustment notification to the screen IC, where the working mode adjustment notification is used to indicate the screen IC to adjust the working mode of the screen to the AOD mode; and the screen IC receives the working mode adjustment notification, and adjusts the working mode of the screen to the AOD mode based on the working mode adjustment notification.

Based on the possible implementation, when the electronic device adjusts the working mode of the screen to the always on display AOD mode, the electronic device may use the system on chip SOC and the screen integrated circuit IC to adjust the refresh rate of the screen image to a relatively low refresh rate, and adjust the working mode of the screen of the electronic device from the normal mode to the AOD mode, thereby reducing power consumption of the electronic device.

With reference to the first aspect, in a possible implementation, that the electronic device determines that a ratio of the to-be-displayed area to all the display areas of the screen is less than a preset threshold may include: The SOC determines a name of a top layer corresponding to the first interface; and the SOC determines, based on the name of the top layer corresponding to the first interface and a top layer whitelist, that the ratio of the to-be-displayed area to all the display areas of the screen is less than the preset threshold, where the top layer whitelist includes a plurality of first top layer names, and a ratio of a to-be-displayed area in an interface corresponding to the first top layer name to all the display areas of the screen is less than the preset threshold.

Based on the possible implementation, when the electronic device adjusts the working mode of the screen to the always on display AOD mode, the electronic device may determine, based on the name of the top layer corresponding to the first interface and the top layer whitelist, whether the ratio of the to-be-displayed area to all the display areas of the screen is less than the preset threshold, so that the working mode of the screen can be adjusted from the normal mode to the always on display AOD mode when the ratio of the to-be-displayed area to all the display areas of the screen is less than the preset threshold, thereby reducing power consumption of the electronic device.

With reference to the first aspect, in a possible implementation, when the ratio of the to-be-displayed area to all the display areas of the screen is greater than the preset threshold, the electronic device adjusts the refresh rate of the screen image from the first refresh rate to a third refresh rate, where the third refresh rate is less than the first refresh rate.

Based on the possible implementation, when the ratio of the to-be-displayed area to all the display areas of the screen is greater than the preset threshold, a manner of supplying power to the screen by the electronic device may not be adjusted, that is, the electronic device may supply power to all the display areas of the screen to meet a display requirement. In addition, the electronic device may adjust the refresh rate of the screen image to a relatively low refresh rate, thereby reducing power consumption of the electronic device.

With reference to the first aspect, in a possible implementation, the first interface may be a static interface.

Based on the possible implementation, when the electronic device adjusts the working mode of the screen to the always on display AOD mode, the electronic device may display the static interface. When the electronic device displays the static interface, the screen refresh rate of the electronic device may be adjusted to a relatively low refresh rate, thereby further reducing power consumption of the electronic device.

With reference to the first aspect, in a possible implementation, the first interface may be a pure black static interface.

Based on the possible implementation, when the electronic device adjusts the working mode of the screen to the always on display AOD mode, the electronic device may display the pure black static interface. When the electronic device displays the pure black static interface, the screen refresh rate of the electronic device may be adjusted to a relatively low refresh rate, thereby further reducing power consumption of the electronic device. In addition, when the electronic device displays the pure black static interface, the electronic device may not supply power to a display area corresponding to the pure black static interface, and the electronic device may supply power to the to-be-displayed area, thereby further reducing power consumption of the electronic device.

With reference to the first aspect, in a possible implementation, the first interface may include a prompt window, the prompt window may be used to prompt a user to touch the screen to enable the screen to display content on the electronic device, and the to-be-displayed area may be used to display the prompt window.

Based on the possible implementation, when the electronic device projects the screen by using the screen projection application, and the electronic device displays the pure black interface, the electronic device may display the prompt window that prompts the user to touch the screen to enable the screen to display the content on the electronic device, thereby facilitating use by the user. In addition, when the electronic device displays the pure black static interface, the to-be-displayed area in the first interface may be used to display the prompt window, so that the electronic device may not supply power to the display area corresponding to the pure black static interface, and the electronic device may supply power to the to-be-displayed area, thereby further reducing power consumption of the electronic device.

According to a second aspect, an embodiment of this application provides a power consumption control apparatus. The power consumption control apparatus may be applied to an electronic device to implement the method according to the first aspect. A function of the power consumption control apparatus may be implemented by using hardware, or may be implemented by executing corresponding software by hardware. The hardware or the software includes one or more modules corresponding to the foregoing functions, for example, a screen projection module, a display module, and an adjustment module.

The screen projection module may be configured to project a screen by using a screen projection application.

The display module may be used to display a first interface, where the first interface includes a to-be-displayed area, a working mode of the screen of the electronic device is a normal mode, and when the working mode of the screen is the normal mode, the electronic device supplies power to all display areas of the screen, and a refresh rate of a screen image on the electronic device is a first refresh rate.

The adjustment module may be configured to adjust the working mode of the screen to an always on display AOD mode when a ratio of the to-be-displayed area to all the display areas of the screen is less than a preset threshold, where when the working mode of the screen is the AOD mode, the electronic device supplies power to the to-be-displayed area, the refresh rate of the screen image on the electronic device is a second refresh rate, and the second refresh rate is less than the first refresh rate.

With reference to the second aspect, in a possible implementation, the adjustment module may be configured to adjust the refresh rate of the screen image from the first refresh rate to the second refresh rate.

The adjustment module may be further configured to adjust the working mode of the screen from the normal mode to the AOD mode.

With reference to the second aspect, in a possible implementation, when the working mode of the screen is the normal mode, a frame drawing rate of the screen image on the electronic device is a first frame drawing rate, where the first refresh rate is greater than the first frame drawing rate, and the second refresh rate is the same as the first frame drawing rate.

With reference to the second aspect, in a possible implementation, the power consumption control apparatus may further include a sending module and a receiving module.

The sending module may be configured to send a first refresh rate adjustment notification to a screen IC, where the first refresh rate adjustment notification includes the second refresh rate.

The receiving module may be configured to receive the first refresh rate adjustment notification.

The adjustment module may be configured to adjust the refresh rate of the screen image from the first refresh rate to the second refresh rate based on the first refresh rate adjustment notification received by the receiving module.

The sending module may be further configured to send a working mode adjustment notification to the screen IC, where the working mode adjustment notification is used to indicate the screen IC to adjust the working mode of the screen to the AOD mode.

The receiving module may be configured to receive the working mode adjustment notification.

The adjustment module may be configured to adjust the working mode of the screen to the AOD mode based on the working mode adjustment notification received by the receiving module.

With reference to the second aspect, in a possible implementation, the power consumption control apparatus may further include a determining module.

The determining module may be configured to determine a name of a top layer corresponding to the first interface.

The determining module may be further configured to determine, based on the name of the top layer corresponding to the first interface and a top layer whitelist, that the ratio of the to-be-displayed area to all the display areas of the screen is less than the preset threshold, where the top layer whitelist includes a plurality of first top layer names, and a ratio of a to-be-displayed area in an interface corresponding to the first top layer name to all the display areas of the screen is less than the preset threshold.

With reference to the second aspect, in a possible implementation, the adjustment module may be further configured to adjust the refresh rate of the screen image from the first refresh rate to a third refresh rate when the ratio of the to-be-displayed area to all the display areas of the screen is greater than the preset threshold, where the third refresh rate is less than the first refresh rate.

With reference to the second aspect, in a possible implementation, the first interface is a static interface.

With reference to the second aspect, in a possible implementation, the first interface is a pure black static interface.

With reference to the second aspect, in a possible implementation, the first interface includes a prompt window, where the prompt window is used to prompt a user to touch the screen to enable the screen to display content on the electronic device, and the to-be-displayed area is used to display the prompt window.

According to a third aspect, a power consumption control device is provided. The power consumption control device has a function of implementing the method according to the first aspect. The function may be implemented by using hardware, or may be implemented by executing corresponding software by hardware. The hardware or the software includes one or more modules corresponding to the foregoing functions.

According to a fourth aspect, a power consumption control device is provided, including a processor and a memory. The memory is configured to store computer-executable instructions. When the power consumption control device runs, the processor executes the computer-executable instructions stored in the memory, to enable the power consumption control device to perform the power consumption control method according to any one of the possible implementations of the first aspect.

According to a fifth aspect, a power consumption control device is provided, including a processor. The processor is configured to: be coupled to a memory, and after reading instructions in the memory, perform the power consumption control method according to any one of the possible implementations of the first aspect based on the instructions.

According to a sixth aspect, an embodiment of this application provides a computer-readable storage medium, where the computer-readable storage medium stores computer program instructions. When the computer program instructions are executed by an electronic device, the electronic device is enabled to implement the power consumption control method according to any one of the first aspect or the possible implementations of the first aspect.

According to a seventh aspect, an embodiment of this application provides a computer program product, including computer-readable code. When the computer-readable code is run in an electronic device, the electronic device is enabled to implement the power consumption control method according to any one of the first aspect or the possible implementations of the first aspect.

According to an eighth aspect, an apparatus (for example, the apparatus may be a chi-system) is provided. The apparatus includes a processor, configured to support an electronic device in implementing a function in the first aspect. In a possible design, the apparatus further includes a memory. The memory is configured to store program instructions and data that are necessary for the electronic device. When the apparatus is a chip system, the apparatus may include a chip, or may include a chip and another discrete device.

It should be understood that, for beneficial effects of the second aspect to the eighth aspect, refer to related descriptions in the first aspect. Details are not described herein again.

BRIEF DESCRIPTION OF DRAWINGS

FIG. 5 is a sequence diagram of a power consumption control method according to an embodiment of this application;

FIG. 6 is a second schematic flowchart of a power consumption control method according to an embodiment of this application.

DESCRIPTION OF EMBODIMENTS

Figure 1:
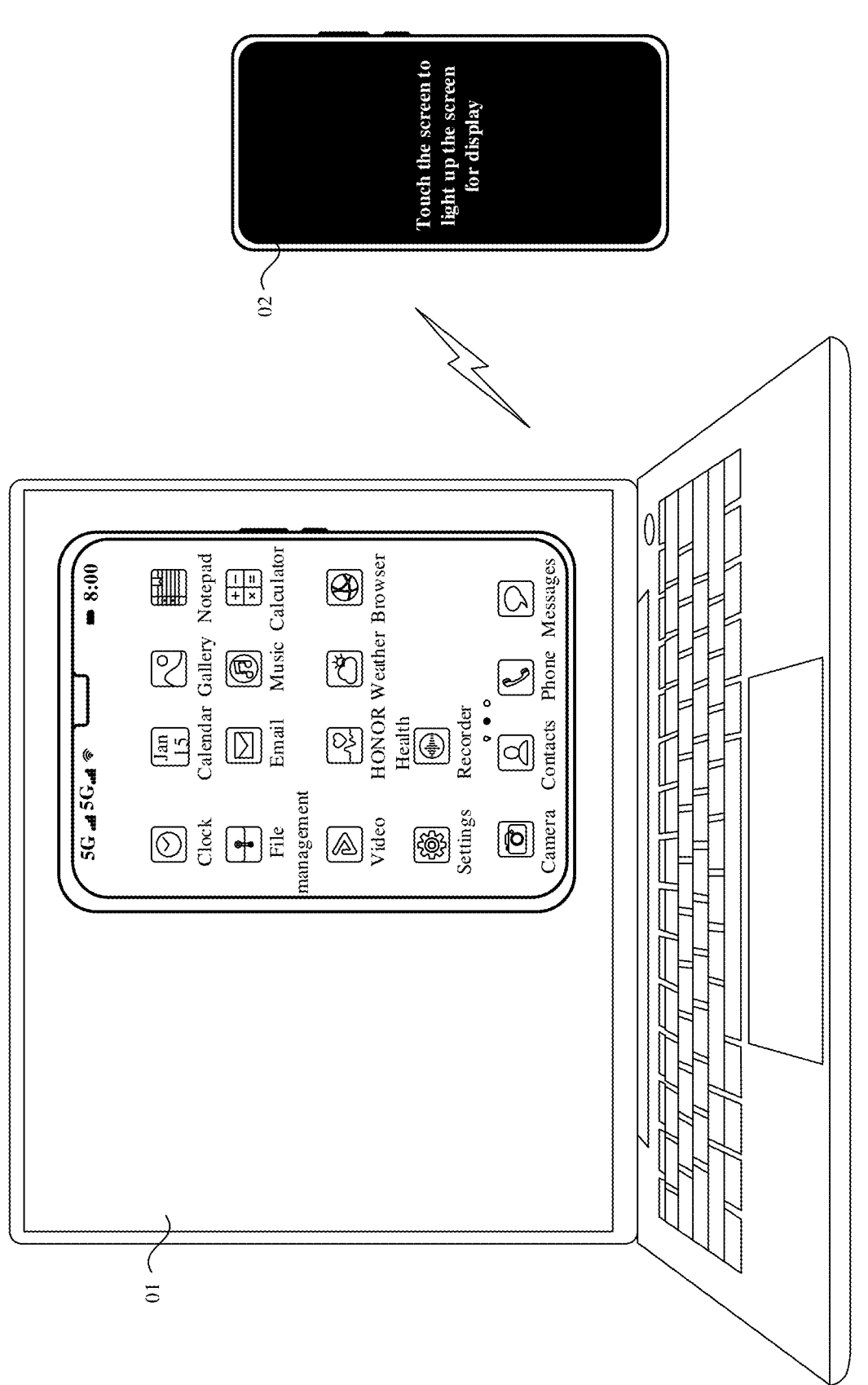
FIG. 1 is a schematic diagram of a display interface of an electronic device according to an embodiment of this application.

The following clearly describes the technical solutions in embodiments of this application with reference to the accompanying drawings in embodiments of this application. Clearly, the described embodiments are merely some rather than all of embodiments of this application. Based on embodiments of this application, all other embodiments obtained by a person of ordinary skill in the art without creative efforts fall within the protection scope of this application.

Terms "first" and "second" are merely used for description purposes, and shall not be understood as indicating or implying relative importance or implicitly indicating a quantity of indicated technical features. Therefore, features defined with "first" and "second" may explicitly or implicitly include one or more of the features. In the description of this application, unless otherwise stated, "a plurality of" means two or more.

Currently, a user may project a screen of one electronic device (such as a mobile phone, a notebook computer, or a personal computer) (which may also be referred to as a display of the electronic device) onto a screen of another electronic device (such as a smart television, a notebook computer, or a tablet computer) for display. For example, the user may project, by using a YourPhone screen projection function on a mobile phone, content displayed on a screen of the mobile phone onto a screen of a notebook computer for display.

The YourPhone screen projection function is an application on a mobile phone. Through the application, a mobile phone of a user can be wirelessly connected to a mobile device such as a notebook computer, so that the user can access information such as an image, a notification, and an SMS message in the mobile phone by using the notebook computer. To be specific, after content displayed on a screen of the mobile phone is projected, by using the YourPhone screen projection function on the mobile phone, onto a screen of the notebook computer for display, the user may operate, on the screen of the notebook computer, the content displayed on the screen of the mobile phone, so that the user can obtain or view information (such as an image, a notification, or an SMS message) on the mobile phone by using the notebook computer, or the user can change the content on the mobile phone by using the notebook computer, for example, deleting an application, opening an application, or downloading an application.

When the mobile phone projects the screen by using the YourPhone screen projection function, the screen of the mobile phone usually displays a specific static interface, such as a pure black interface. When the screen of the mobile phone displays the specific static interface, such as the pure black interface, the screen of the mobile phone may further display a prompt window, which is used to prompt that the user can touch the screen of the mobile phone to light up the screen of the mobile phone, so that the screen of the mobile phone can display the content on the mobile phone.

For example, as shown in FIG. 1, a user may project, by using a YourPhone screen projection function on a mobile phone 02, content displayed on a screen of the mobile phone 02 onto a screen of a notebook computer 01 for display. After the content displayed on the screen of the mobile phone 02 is projected, by using the YourPhone screen projection function on the mobile phone 02, onto the screen of the notebook computer 01 and is successfully displayed, the screen of the notebook computer 01 can display the content displayed on the screen of the mobile phone 02, for example, an application included on the mobile phone. The user can obtain or view information such as an image, a notification, or an SMS message in the mobile phone 02 by using the notebook computer 01.

The screen of the mobile phone 02 may display the specific static interface, that is, the pure black interface. The screen of the mobile phone 02 may further display a prompt window. The prompt window may include words "touch the screen to light up the screen for display" to prompt that the user can touch the screen of the mobile phone to light up the screen of the mobile phone, so that the screen of the mobile phone 02 can display the content on the mobile phone.

When the mobile phone 02 projects the screen by using the YourPhone screen projection function, a refresh rate of a screen image on the mobile phone 02 is usually relatively high, and is usually 60 hertz (hertz, Hz). When the screen of the mobile phone 02 displays the specific static interface, a frame drawing rate of the screen image on the mobile phone 02 is usually 30 Hz.

The refresh rate (which may also be referred to as a screen refresh rate) of the screen image on the mobile phone 02 refers to a quantity of times of repeatedly scanning an image on the screen from top to bottom. A larger quantity of times of repeated scanning indicates more frames and picture information displayed on the screen of the mobile phone 02 and a smoother picture, that is, a higher refresh rate indicates a smoother picture displayed on the screen of the mobile phone 02. Generally, the mobile phone 02 uses a screen with a refresh rate of 60 Hz, to be specific, the screen of the mobile phone 02 can display 60 frames of pictures in one second. In other words, the screen of the mobile phone 02 can display 60 pictures per second, so that a picture generated at each moment can be displayed.

The frame drawing rate (which may also be referred to as a frame rate or a frame output rate) of the screen image on the mobile phone 02 is a quantity of frames of images output or drawn by the mobile phone 02 per second, and may also be understood as a quantity of images that can be output by a graphics processing unit of the mobile phone 02 per second or a quantity of images that can be drawn by the graphics processing unit per second. In other words, the frame drawing rate of the screen image on the mobile phone 02 is a quantity of pictures that can be played (or recorded) by the mobile phone 02 per second. A higher frame drawing rate of the screen image on the mobile phone 02 may obtain a smoother and more realistic animation.

In some examples, when the mobile phone 02 runs different service scenarios, quantities of frames (that is, frame output rates of the mobile phone 02) of image data that are output by the mobile phone 02 to the display per second are also different. For example, when the mobile phone 02 successfully projects the screen by using the YourPhone screen projection function, and the screen of the mobile phone 02 displays the specific static interface (that is, an interface displayed on the screen of the mobile phone 02 remains static), the frame drawing rate of the screen image on the mobile phone 02 may be 30 Hz. To be specific, the graphics processing unit of the mobile phone 02 can output 30 images in one second, or the graphics processing unit can draw 30 images in one second. Therefore, when the frame drawing rate of the screen image on the mobile phone 02 is 30 Hz, the refresh rate of the screen image on the mobile phone 02 is 30 Hz, and a display requirement can be met.

When the screen of the mobile phone 02 displays a dynamic interface (for example, a video playing scenario), the frame drawing rate of the screen image on the mobile phone 02 may be 60 Hz.

When the mobile phone 02 projects the screen by using the YourPhone screen projection function, the frame drawing rate of the screen image on the mobile phone 02 is 30 Hz. Therefore, the screen of the mobile phone 02 does not require a relatively high refresh rate. In other words, when the mobile phone 02 projects the screen by using the YourPhone screen projection function, a display requirement can be met when the refresh rate of the screen image on the mobile phone 02 is 30 Hz. However, when the mobile phone 02 projects the screen by using the YourPhone screen projection function, the refresh rate of the screen image on the mobile phone 02 is 60 Hz, which causes relatively high power consumption of the mobile phone 02.

In addition, when the mobile phone 02 projects the screen by using the YourPhone screen projection function, the screen of the mobile phone 02 displays the specific static interface. Therefore, the screen of the mobile phone 02 does not require a very high refresh rate to meet a display requirement.

In addition, when the mobile phone 02 projects the screen by using the YourPhone screen projection function, the mobile phone 02 usually supplies power to an entire display area of the screen. Moreover, when the screen of the mobile phone 02 displays the pure black interface, and the screen of the mobile phone 02 further displays the prompt window, the prompt window occupies only a partial area of the screen of the mobile phone 02. Therefore, the mobile phone 02 may supply power to a display area corresponding to the prompt window on the screen. However, the mobile phone 02 supplies power to the entire display area of the screen, which further causes relatively high power consumption of the mobile phone 02.

To resolve the foregoing problem, embodiments of this application provide a power consumption control method, applied to an electronic device. In the method, when an electronic device projects a screen by using a screen projection function (for example, YourPhone), a refresh rate of a screen image on the electronic device can be reduced. For example, a working mode of the screen of the electronic device is adjusted to reduce the refresh rate of the screen image on the electronic device. For example, the working mode of the screen of the electronic device is adjusted to an always on display (always on display, AOD) mode to reduce power consumption of the electronic device generated during screen projection.

When the working mode of the screen of the electronic device is the AOD mode, the refresh rate of the screen image on the electronic device is usually 30 Hz. When the electronic device projects the screen by using the screen projection function (for example, YourPhone), a frame drawing rate of the screen image on the electronic device is usually 30 Hz. In other words, when the electronic device projects the screen by using the screen projection function (for example, YourPhone), the working mode of the screen of the electronic device is adjusted to the AOD mode, and the refresh rate of the screen image on the electronic device is the same as the frame drawing rate of the screen image on the electronic device, which not only can meet a display requirement of the screen of the electronic device, but also can avoid relatively high power consumption of the electronic device caused by a relatively high refresh rate of the screen image on the electronic device.

In addition, when the working mode of the screen of the electronic device is the AOD mode, the screen of the electronic device may supply power to a partial display area that needs to be displayed, and does not need to supply power to an entire display area of the screen of the electronic device. Therefore, when the electronic device projects the screen by using the screen projection function (for example, YourPhone), and the screen of the electronic device displays a pure black interface and a prompt window, the screen of the electronic device may supply power to a display area in which the prompt window is located, and does not need to supply power to the entire display area of the screen of the electronic device, thereby further reducing power consumption of the electronic device.

The following describes the power consumption control method provided in the embodiments of this application.

The power consumption control method provided in the embodiments of this application may be applied to an electronic device. In some embodiments, the electronic device may be an electronic device having a screen projection function, for example, a mobile phone, a tablet computer, a handheld computer, a personal computer (personal computer, PC), a cellular phone, a personal digital assistant (personal digital assistant, PDA), or a wearable device. A specific form of the electronic device is not limited herein in the embodiments of this application.

It should be noted that, the screen projection function of the electronic device may be a screen projection application on the electronic device, such as a YourPhone screen projection function. The screen projection function of the electronic device may alternatively be a screen projection function of an application on the electronic device, for example, a screen projection function included in an application such as a video playing application. A specific form of the screen projection function of the electronic device is not limited in the embodiments of this application. In the embodiments of this application, that the screen projection function of the electronic device is the YourPhone screen projection function on the electronic device is used as an example for description.

Figure 2:
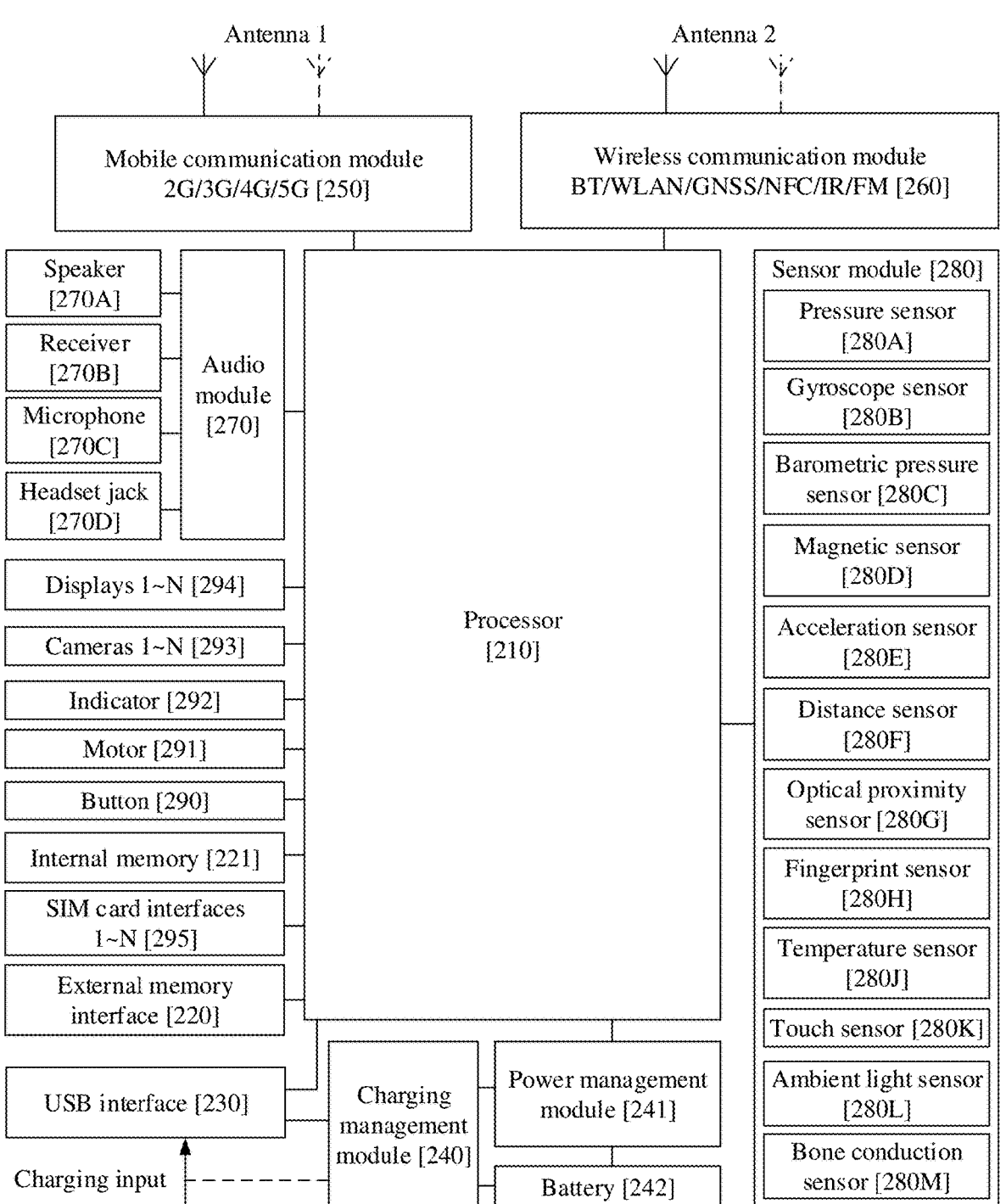
FIG. 2 is a schematic diagram of a hardware structure of an electronic device according to an embodiment of this application.

For example, the electronic device is a mobile phone. FIG. 2 is a schematic diagram of a structure of an electronic device according to an embodiment of this application.

As shown in FIG. 2, the electronic device may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identification module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment does not specifically limit the electronic device. In some other embodiments, the electronic device may include more or fewer components than those shown in the figure, or combine some components, or split some components, or have different component arrangements. The components shown in the figure may be implemented by using hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device. The controller may generate an operation control signal based on instruction operation code and a timing signal, to control instruction fetching and instruction execution.

The memory may be further disposed in the processor 210 to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It should be noted that, in this embodiment of this application, the electronic device may further include a system on chip (system on chip, SOC). The system on chip SOC, which may also be referred to as a system on chip, is an integrated circuit with a dedicated purpose, and includes a complete system and all content of embedded software.

In this embodiment of this application, the SOC of the electronic device may be configured to determine whether the electronic device enters a screen projection mode. The SOC of the electronic device may be further configured to determine whether an area that needs to be displayed on a screen is a partial display area when the electronic device enters the screen projection mode. When the SOC of the electronic device determines that the area that needs to be displayed on the screen is the partial display area when the electronic device enters the screen projection mode, the SOC of the electronic device may send an instruction to a screen integrated circuit (integrated circuit, IC), so that the screen IC can adjust a working mode of the screen to an AOD mode.

The screen IC may be configured to adjust the working mode of the screen, for example, adjust the working mode to the AOD mode. The screen IC may be further configured to adjust a refresh rate of a screen image, for example, adjust the refresh rate of the screen image to a refresh rate corresponding to the AOD mode.

A wireless communication function of the electronic device may be implemented by using the antenna 1, the antenna 2, the mobile communication module 250, the wireless communication module 260, the modem processor, the baseband processor, and the like.

The antenna 1 and the antenna 2 are configured to transmit and receive electromagnetic wave signals. Each antenna in the electronic device may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 250 may provide a solution for wireless communication including 2G/3G/4G/5G and the like applied to the electronic device. The mobile communication module 250 may include at least one filter, switch, power amplifier, low noise amplifier (low noise amplifier, LNA), and the like. The mobile communication module 250 may receive an electromagnetic wave through the antenna 1, perform processing such as filtering and amplification on the received electromagnetic wave, and send a processed electromagnetic wave to the modem processor for demodulation. The mobile communication module 250 may further amplify a signal modulated by the modem processor, and convert the signal into an electromagnetic wave by using the antenna 1 for radiation. In some embodiments, at least some functional modules of the mobile communication module 250 may be disposed in the processor 210. In some embodiments, at least some functional modules of the mobile communication module 250 may be disposed in a same component as at least some modules of the processor 210.

The wireless communication module 260 may provide a solution for wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like applied to the electronic device. The wireless communication module 260 may be one or more components integrated with at least one communication processing module. The wireless communication module 260 receives an electromagnetic wave by using the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave by using the antenna 2 for radiation.

In some embodiments, the antenna 1 and the mobile communication module 250 of the electronic device are coupled, and the antenna 2 and the wireless communication module 260 are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like.

The electronic device implements a display function by using the GPU, the display 294, the application processor, and the like. The GPU is a microprocessor for image processing, and is connected to the display 294 and the application processor. The GPU is configured to perform mathematical and geometric computing for graphics rendering. The processor 210 may include one or more GPUs that execute program instructions to generate or change displayed information.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a Miniled, a MicroLed, a Micro-oLed, or a quantum dot light emitting diode (quantum dot light emitting diodes, QLED). In some embodiments, the electronic device may include one or N displays 294, where N is a positive integer greater than 1.

The electronic device may implement a photographing function by using the ISP, the camera 293, the video codec, the GPU, the display 294, the application processor, and the like. In some embodiments, the electronic device may include one or N cameras 293, where N is a positive integer greater than 1.

The internal memory 221 may be configured to store computer-executable program code. The executable program code includes instructions. The processor 210 runs the instructions stored in the internal memory 221 to perform various functional applications and data processing of the electronic device. The internal memory 221 may include a program storage area and a data storage area. The program storage area may store an operating system, an application required by at least one function (for example, a sound playing function or an image playing function), and the like. The data storage area may store data (for example, audio data and a phone book) and the like created during use of the electronic device. In addition, the internal memory 221 may include a high-speed random access memory, and may further include a non-volatile memory, for example, at least one magnetic disk memory, a flash memory device, or a universal flash storage (universal flash storage, UFS).

The acceleration sensor 280E may periodically collect acceleration data of the electronic device at a specific frequency, for example, may collect magnitudes of acceleration of the electronic device in all directions (which are usually an X-axis direction, a Y-axis direction, and a Z-axis direction).

Certainly, it may be understood that FIG. 2 merely shows an example for description when a form of the electronic device is a mobile phone. If the electronic device is in another device form such as a tablet computer, a handheld computer, a PC, a PDA, or a wearable device (for example, a smartwatch or a smart band), the structure of the electronic device may include fewer structures than those shown in FIG. 2 or may include more structures than those shown in FIG. 2. This is not limited herein.

It may be understood that a function of the electronic device usually needs to be implemented based on cooperation of software in addition to support of hardware.

A software system of the electronic device may use a layered architecture, an event-driven architecture, a micro-kernel architecture, a microservice architecture, or a cloud architecture. In the embodiments of the present invention, an Android system with a layered architecture is used as an example to describe a software structure of the electronic device.

Figure 3:
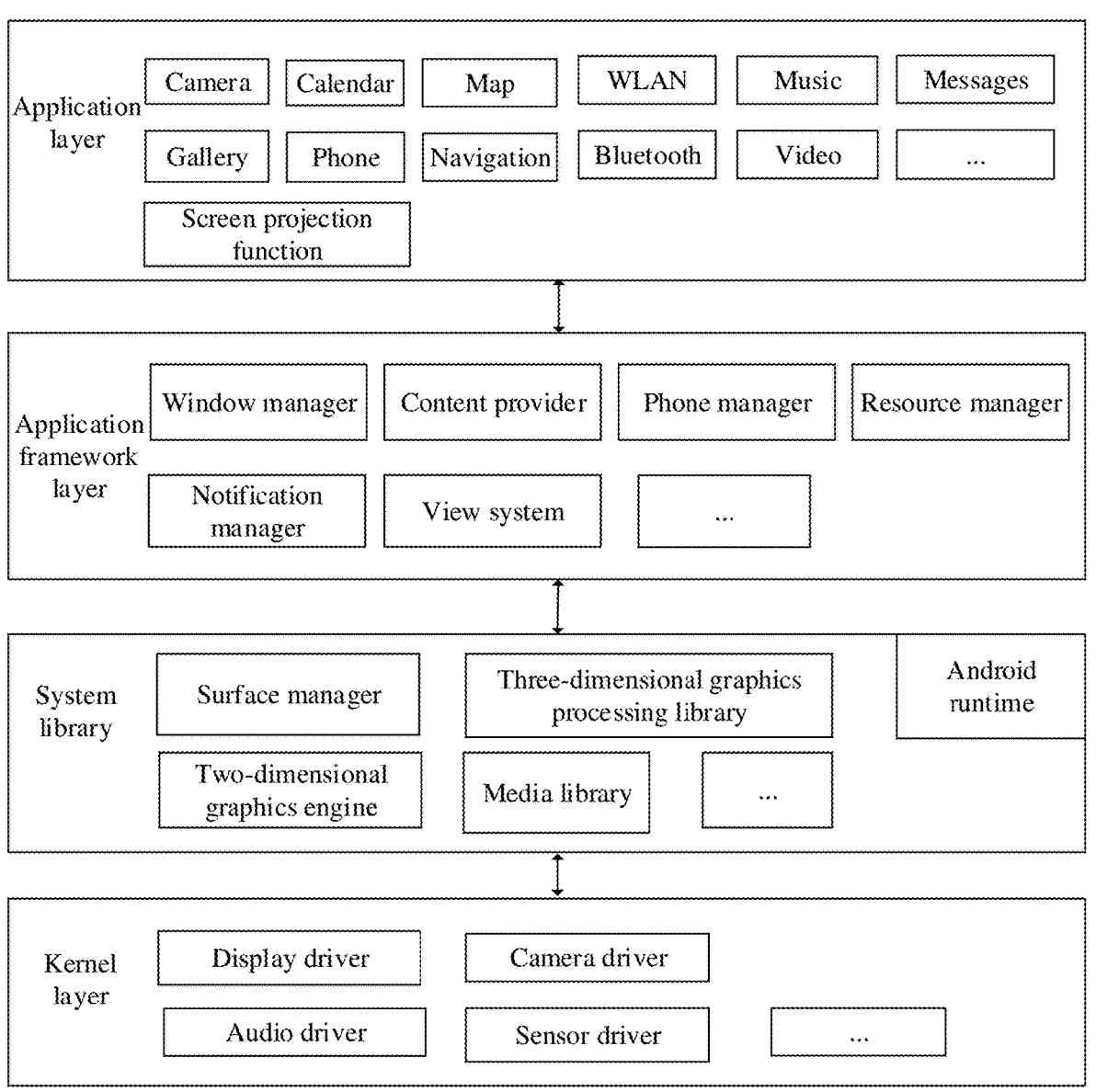
FIG. 3 is a schematic diagram of a software structure of an electronic device according to an embodiment of this application.

FIG. 3 is a block diagram of a software structure of an electronic device according to an embodiment of the present invention.

In the layered architecture, software is divided into several layers, and each layer has a clear role and task. The layers communicate with each other through a software interface. In some embodiments, the Android system is divided into four layers, which are respectively an application layer, an application framework layer, an Android runtime (Android runtime) and system library, and a kernel layer from top to bottom.

The application layer may include a series of application packages.

As shown in FIG. 3, the application layer may include applications such as Camera, Gallery, Calendar, Phone, Map, Navigation, WLAN, Bluetooth, Music, Video, Messages, and a screen projection function (for example, a YourPhone screen projection function).

The application framework layer provides an application programming interface (application programming interface, API) and a programming framework for the application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether a status bar exists, lock a screen, take a screenshot, and the like.

The content provider is configured to store and obtain data, and enable the data to be accessible to an application. The data may include videos, images, audio, calls that are made and answered, browsing histories and bookmarks, phone books, and the like.

The view system includes visual controls, for example, a control for displaying text and a control for displaying a picture. The view system may be configured to construct an application. A display interface may include one or more views. For example, a display interface including an SMS message notification icon may include a view for displaying text and a view for displaying a picture.

The phone manager is configured to provide a communication function of the electronic device, for example, call status management (including answering, hanging up, and the like).

The resource manager provides various resources for an application, for example, a localized string, an icon, a picture, a layout file, and a video file.

The notification manager enables an application to display notification information in a status bar, and may be configured to convey a notification-type message. The displayed notification information may automatically disappear after a short stay without user interaction. For example, the notification manager is configured to notify download completion, provide a message reminder, and the like. The notification manager may alternatively be a notification that appears in a top status bar of the system in a form of a graph or scroll bar text, for example, a notification of an application running in the background or a notification that appears on a screen in a form of a dialog window. For example, text information is prompted in the status bar, an alert tone is produced, the electronic device vibrates, or an indicator light blinks.

The Android runtime includes a kernel library and a virtual machine. The Android runtime is responsible for scheduling and management of the Android system.

The kernel library includes two parts: One part is a functional function that needs to be invoked by a java language, and the other part is a kernel library of Android.

The application layer and the application framework layer are run in the virtual machine. The virtual machine executes java files at the application layer and the application framework layer as binary files. The virtual machine is configured to perform functions such as lifecycle management of an object, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a two-dimensional graphics engine (for example, SGL).

The surface manager is configured to manage a display subsystem, and provide fusion of two-dimensional and three-dimensional layers for a plurality of applications.

The media library supports playing and recording in a plurality of common audio and video formats, a static image file, and the like. The media library may support a plurality of audio and video encoding formats.

The three-dimensional graphics processing library is configured to implement three-dimensional graphics drawing, image rendering and composition, layer processing, and the like.

The two-dimensional graphics engine is a drawing engine for two-dimensional drawings.

The kernel layer is a layer between hardware and software. The kernel layer includes at least a display driver, a camera driver, an audio driver, and a sensor driver.

Figure 4:
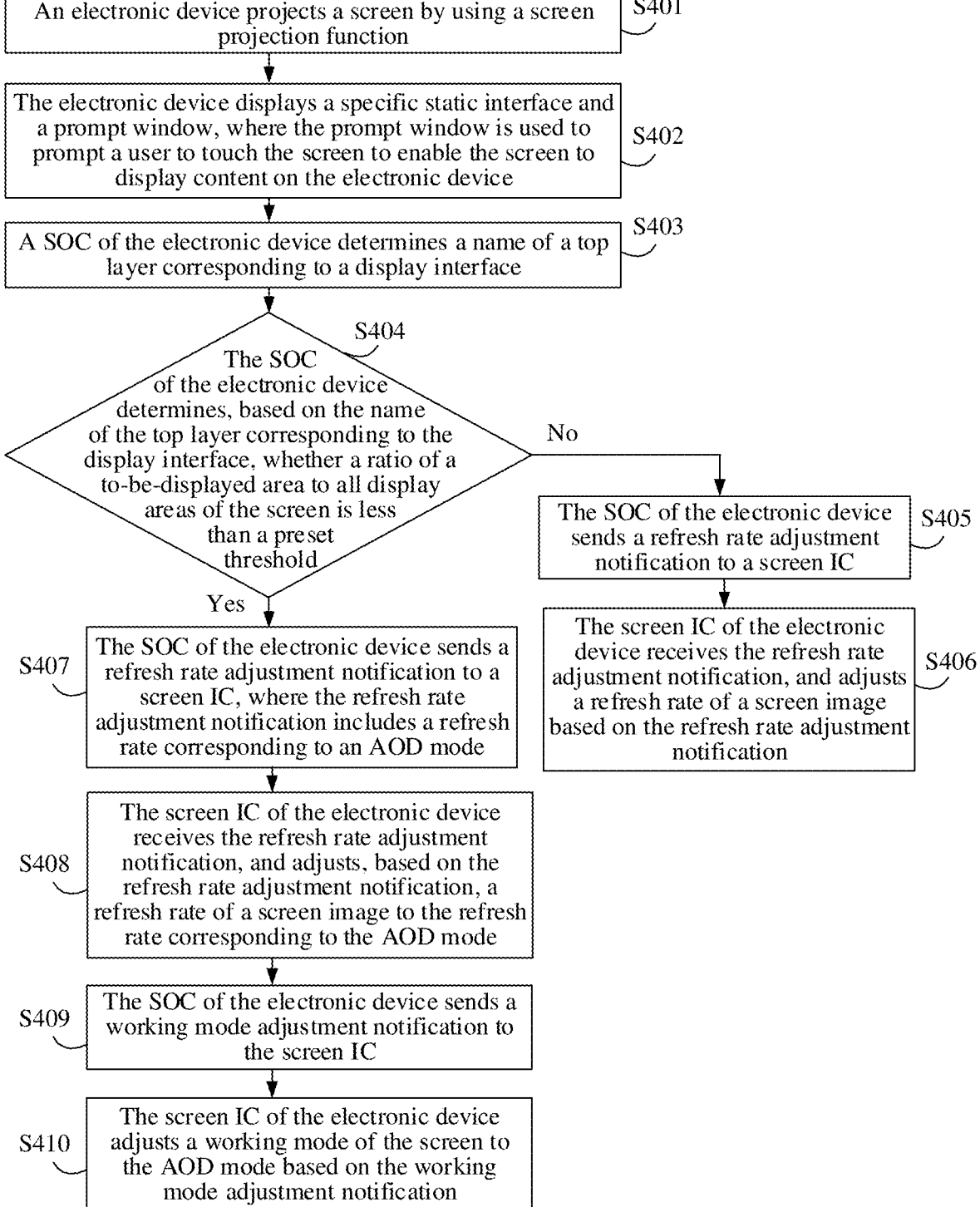
FIG. 4 is a first schematic flowchart of a power consumption control method according to an embodiment of this application.

With reference to FIG. 4, the following describes in detail the power consumption control method provided in embodiments of this application. The embodiments of this application are illustrated by using an example in which an electronic device projects a screen by using a YourPhone screen projection function, and adjusts a working mode of the screen of the electronic device to an AOD mode, to reduce a refresh rate of a screen image on the electronic device.

FIG. 4 is a schematic flowchart of a power consumption control method according to an embodiment of this application. As shown in FIG. 4, the power consumption control method may include the following S401-S410.

S401: An electronic device projects a screen by using a screen projection function.

When a user needs to project the screen of the electronic device (such as a mobile phone) onto a screen of another electronic device (such as a notebook computer), the user may project, by using the screen projection function such as a YourPhone screen projection function on the electronic device, the screen of the electronic device onto the screen of the another electronic device for display, that is, content displayed on the screen of the electronic device may be projected onto the screen of the another electronic device for display.

After the electronic device projects, by using the screen projection function such as the YourPhone screen projection function, the content displayed on the screen of the electronic device onto the screen of the another electronic device and successfully displays the content, the screen of the another electronic device can display the content displayed on the screen of the electronic device, for example, an application included in the electronic device. The user can obtain or view information such as an image, a notification, or an SMS message in the electronic device by using the another electronic device.

It should be noted that the electronic device may alternatively project the screen by using another screen projection function. The another screen projection function of the electronic device may alternatively be a screen projection function of an application on the electronic device, for example, a screen projection function included in an application such as a video playing application.

S402: The electronic device displays a specific static interface and a prompt window, where the prompt window is used to prompt a user to touch the screen to enable the screen to display content on the electronic device.

After the electronic device projects, by using the YourPhone screen projection function, the content displayed on the screen of the electronic device onto the screen of the another electronic device and successfully displays the content, the user can obtain or view information such as an image, a notification, or an SMS message in the electronic device by using the another electronic device, and does not need to perform an operation on the screen of the electronic device. Therefore, the screen of the electronic device may display the specific static interface (which may be referred to as a first interface in this embodiment of this application). The specific static interface, that is, a static interface, means that an interface displayed on the screen of the electronic device remains static. For example, the specific static interface may be a pure black interface.

When the screen of the electronic device displays the specific static interface, the screen of the electronic device may further display the prompt window. The prompt window may be used to prompt the user to touch the screen of the electronic device to light up the screen of the electronic device, so that the screen of the electronic device can display the content on the electronic device. In other words, the user may touch the screen of the electronic device, so that the screen of the electronic device can be restored to normal display.

In some examples, the prompt window may include words "touch the screen to light up the screen for display" to prompt that the user can touch the screen of the mobile phone to light up the screen of the electronic device, so that the screen of the electronic device can display the content on the electronic device.

When the electronic device projects the screen by using the YourPhone screen projection function, and the screen of the electronic device displays the specific static interface, a refresh rate of a screen image on the electronic device is usually greater than a frame drawing rate of the screen image on the electronic device. Generally, when the electronic device projects the screen by using the YourPhone screen projection function, and the screen of the electronic device displays the specific static interface, the refresh rate of the screen image on the electronic device is usually high, where the refresh rate is usually 60 Hz. When the electronic device projects the screen by using the YourPhone screen projection function, and the screen of the electronic device displays the specific static interface, the frame drawing rate of the screen image on the electronic device is usually 30 Hz.

When the electronic device projects the screen by using the YourPhone screen projection function, and the screen of the electronic device displays the specific static interface, the refresh rate (which may be referred to as a first refresh rate in this embodiment of this application) of the screen image on the electronic device is 60 Hz, to be specific, a quantity of times of repeatedly scanning an image in the screen image on the electronic device from top to bottom is 60; and the frame drawing rate (which may be referred to as a first frame drawing rate in this embodiment of this application) of the screen image on the electronic device is 30 Hz, to be specific, a quantity of frames of images output or drawn by the electronic device per second is 30. In this case, a display requirement can be met when the quantity of times of repeatedly scanning an image in the screen image on the electronic device from top to bottom is 30. However, in this case, the quantity of times of repeatedly scanning an image on the screen of the electronic device from top to bottom is 60, which causes relatively high power consumption of the electronic device.

In some examples, when the screen of the electronic device displays the specific static interface, and the screen of the electronic device further displays the prompt window, a display area occupied by the prompt window on the screen is usually a partial display area of the screen, that is, some pixels on the screen may be used to display the prompt window.

It should be noted that, when the specific static interface displayed on the screen of the electronic device is a pure black interface, the electronic device may not supply power to an entire display area of the screen, thereby reducing power consumption of the electronic device. However, when the specific static interface displayed on the screen of the electronic device is the pure black interface, and the electronic device further displays the prompt window in a partial display area of the screen, the electronic device supplies power to the entire display area of the screen, which further causes relatively high power consumption of the electronic device.

S403: A SOC of the electronic device determines a name of a top layer corresponding to a display interface.

After the electronic device displays the specific static interface and the prompt window, the electronic device, such as the SOC of the electronic device, may determine the name of the top layer corresponding to the display interface (that is, the specific static interface, namely, the first interface) of the electronic device, to determine, based on the name of the top layer corresponding to the display interface of the electronic device, whether a ratio of an area that needs to be displayed on the screen of the electronic device to all display areas of the screen is less than a preset threshold.

A layer of the display interface of the electronic device includes a plurality of pixels, and one or more layers are superposed to form an image corresponding to the entire display interface. For example, each layer may be similar to "transparent glass". If there is nothing on the "transparent glass", the "transparent glass" is a completely transparent empty layer (or referred to as a transparent layer); and if there is an image on the "transparent glass", the "transparent glass" may be referred to as a non-transparent layer.

Generally, layers are like films including elements such as text or graphics, and are stacked in sequence to be combined to form a final effect of a page. The layer can accurately position the element on the page. Text, a picture, a table, or a plug-in may be added to the layer, or a layer may be nested into the layer.

For example, drawing is performed on sheets of transparent glass paper, and content on lower paper can be seen through upper glass paper. However, regardless of how drawing is performed at the upper layer, the lower glass paper is not affected, and the upper layer shields a lower image. Finally, the sheets of glass paper are superposed, and a final combination effect can be changed by moving a relative location of each layer of glass paper or adding more glass paper.

For example, when the specific static interface (such as a pure black interface) and the prompt window are displayed, the top layer corresponding to the display interface of the electronic device is a pure black layer, and the pure black layer includes (that is, incorporates) the prompt window. For example, the pure black layer includes the words "touch the screen to light up the screen for display" corresponding to the prompt window.

An image corresponding to the display interface of the electronic device is usually an entire image formed by superposing a plurality of (for example, eight) layers, and each layer corresponds to one name. The electronic device may store the name corresponding to each layer of the image corresponding to the display interface, so that the electronic device, such as the SOC of the electronic device, can determine, based on the stored name corresponding to each layer of the image corresponding to the display interface, the name of the top layer corresponding to the display interface of the electronic device.

For example, when the specific static interface (such as a pure black interface) and the prompt window are displayed, the SOC of the electronic device may determine, based on the stored name corresponding to each layer of the image corresponding to the display interface, that the name of the top layer corresponding to the display interface of the electronic device is "com.microsoft.deviceExperiences-.blackscreen#0". In other words, the layer corresponding to the name is a pure black layer, and the pure black layer includes the prompt window (that is, the pure black layer incorporates the prompt window). For example, the pure black layer includes the words "touch the screen to light up the screen for display" corresponding to the prompt window.

In some examples, after the electronic device successfully projects the screen by using the YourPhone screen projection function, that is, after the electronic device displays the specific static interface and the prompt window, the electronic device may send a screen projection success message to the SOC of the electronic device by using the YourPhone screen projection function. After the SOC of the electronic device receives the screen projection success message sent by using the YourPhone screen projection function, the electronic device may perform layer identification to determine the name of the top layer corresponding to the display interface, so as to determine, based on the name of the top layer corresponding to the display interface of the electronic device, whether the ratio of the area that needs to be displayed on the screen of the electronic device to all the display areas of the screen is less than the preset threshold.

In some other examples, the SOC of the electronic device may alternatively determine, in real time, the name of the top layer corresponding to the display interface, so as to determine, based on the name of the top layer corresponding to the display interface of the electronic device, whether the ratio of the area that needs to be displayed on the screen of the electronic device to all the display areas of the screen is less than the preset threshold.

S404: The SOC of the electronic device determines, based on the name of the top layer corresponding to the display interface, whether a ratio of a to-be-displayed area to all the display areas of the screen is less than the preset threshold.

After the SOC of the electronic device determines the name of the top layer, the SOC of the electronic device may determine, based on the name of the top layer corresponding to the display interface (that is, the first interface), whether the ratio of the to-be-displayed area (that is, a to-be-displayed area in the first interface) of the screen of the electronic device to all the display areas of the screen is less than the preset threshold, and when determining that the ratio of the area that needs to be displayed on the screen of the electronic device to all the display areas of the screen is less than the preset threshold, the SOC of the electronic device may adjust a working mode of the screen to an AOD mode.

In other words, the first interface may include the to-be-displayed area. The to-be-displayed area is an area that needs to be displayed in the first interface, and may also be understood as an area to which the electronic device needs to supply power in the first interface. For example, when the first interface is a pure black static interface, and the first interface includes the prompt window, a display area in which the prompt window is located is the to-be-displayed area.

The preset threshold may be set based on an actual situation. This is not limited in this embodiment of this application. For example, the preset threshold may be ⅓. To be specific, when determining that the area that needs to be displayed on the screen of the electronic device is less than ⅓ of the entire display area of the screen of the electronic device, the SOC of the electronic device may adjust the working mode of the screen to the AOD mode.

When the working mode of the screen of the electronic device is the AOD mode, the electronic device may supply power to ⅓ of the display area of the screen, that is, the electronic device may supply power to a partial display area that needs to be displayed (that is, ⅓ of the display area of the screen of the electronic device), and does not need to supply power to the entire display area of the screen of the electronic device. Therefore, if the electronic device projects the screen by using the screen projection function (for example, YourPhone), and the screen of the electronic device displays the pure black interface and the prompt window, when determining that the area that needs to be displayed on the screen of the electronic device is less than ⅓ of the entire display area of the screen of the electronic device, the SOC of the electronic device may adjust the working mode of the screen of the electronic device to the AOD mode, so that the electronic device can supply power to the display area in which the prompt window is located, and does not need to supply power to the entire display area of the screen of the electronic device, thereby reducing power consumption of the electronic device.

In some examples, that the SOC of the electronic device may determine, based on the name of the top layer corresponding to the display interface, whether the ratio of the area that needs to be displayed on the screen of the electronic device to all the display areas of the screen is less than the preset threshold may include: The SOC of the electronic device determines, based on the name of the top layer corresponding to the display interface and a top layer whitelist, whether the ratio of the area that needs to be displayed on the screen of the electronic device to all the display areas of the screen is less than the preset threshold.

In other words, after the SOC of the electronic device determines the name of the top layer corresponding to the display interface, the SOC of the electronic device may query whether the top layer whitelist includes the name of the top layer corresponding to the display interface, so as to determine whether the ratio of the area that needs to be displayed on the screen of the electronic device to all the display areas of the screen is less than the preset threshold. To be specific, when the top layer whitelist includes the name of the top layer corresponding to the display interface, the SOC of the electronic device may determine that the ratio of the area that needs to be displayed on the screen of the electronic device to all the display areas of the screen is less than the preset threshold; and when the top layer whitelist does not include the name of the top layer corresponding to the display interface, the SOC of the electronic device may determine that the ratio of the area that needs to be displayed on the screen of the electronic device to all the display areas of the screen is less than the preset threshold.

The top layer whitelist may include a plurality of top layer names (which may be referred to as first top layer names in this embodiment of this application). Different first top layer names may correspond to different display interfaces, or different first top layer names may correspond to different applications. The top layer whitelist may be preset in the electronic device. In addition, a ratio of a to-be-displayed area corresponding to a top layer corresponding to the top layer name (that is, the first top layer name) included in the top layer whitelist to all the display areas of the screen is less than the preset threshold.

For example, the top layer whitelist may include a top layer name "com.microsoft.deviceExperiences.blackscreen#0", that is, a ratio of a display area corresponding to a layer corresponding to the top layer name to all the display areas of the screen is less than the preset threshold. After the electronic device successfully projects the screen by using the YourPhone screen projection function, the electronic device may display the specific static interface and the prompt window. The SOC of the electronic device may determine the name of the top layer corresponding to the display interface, and the SOC of the electronic device determines that the name of the top layer corresponding to the display interface is "com.microsoft.deviceExperiences-.blackscreen#0". The SOC of the electronic device may traverse the top layer whitelist to determine whether a top layer name the same as the name of the top layer corresponding to the display interface exists in the top layer whitelist. The SOC of the electronic device determines that the top layer name named "com.microsoft.deviceExperiences.blackscreen#0" exists in the top layer whitelist, and therefore, the SOC of the electronic device may determine that the ratio of the area that needs to be displayed on the screen of the electronic device to all the display areas of the screen is less than the preset threshold.

When the SOC of the electronic device determines that the ratio of the area that needs to be displayed on the screen of the electronic device to all the display areas of the screen is greater than the preset threshold, the electronic device may adjust the refresh rate of the screen image, that is, the electronic device may perform the following S405-S406. When the SOC of the electronic device determines that the ratio of the area that needs to be displayed on the screen of the electronic device to all the display areas of the screen is less than the preset threshold, the SOC of the electronic device may adjust the refresh rate of the screen image, and adjust the working mode of the screen to the AOD mode, so as to adjust a power supply manner of the screen (that is, supplying power only to a partial display area that needs to be displayed on the screen), that is, the electronic device may perform the following S407-S410.

It should be noted that, when the SOC of the electronic device determines that the ratio of the area that needs to be displayed on the screen of the electronic device to all the display areas of the screen is equal to the preset threshold, the electronic device may adjust the refresh rate of the screen image, that is, the electronic device may perform the following S405-S406; or the SOC of the electronic device may adjust the refresh rate of the screen image, and adjust the working mode of the screen to the AOD mode, so as to adjust the power supply manner of the screen, that is, the electronic device may perform the following S407-S410. This is not limited in this embodiment of this application.

S405: The SOC of the electronic device sends a refresh rate adjustment notification to a screen IC.

When the SOC of the electronic device determines that the ratio of the area that needs to be displayed on the screen of the electronic device to all the display areas of the screen is greater than the preset threshold, the electronic device may not adjust the power supply manner of the screen (which may also be referred to as a power supply manner of the screen IC), that is, the electronic device may not adjust the working mode of the screen (which may also be referred to as a working mode of the screen IC). However, when the electronic device projects the screen by using the YourPhone screen projection function, and the electronic device displays the specific static interface and the prompt window, the refresh rate of the screen image on the electronic device is usually greater than the frame drawing rate of the screen image on the electronic device. Therefore, the electronic device may adjust the refresh rate of the screen image, thereby reducing power consumption of the electronic device generated during screen projection.

In some examples, that the electronic device adjusts the refresh rate of the screen image may include: The SOC of the electronic device may send the refresh rate adjustment notification (which may be referred to as a second refresh rate adjustment notification in this embodiment of this application) to the screen IC. The refresh rate adjustment notification may be used to indicate the screen IC to reduce the refresh rate of the screen image. After the screen IC receives the refresh rate adjustment notification sent by the SOC of the electronic device, the screen IC may adjust the refresh rate of the screen image, that is, the screen IC may reduce the refresh rate of the screen image based on the refresh rate adjustment notification.

In some examples, the refresh rate adjustment notification may further include an adjusted refresh rate (which may be referred to as a third refresh rate in this embodiment of this application) of the screen image. To be specific, after the screen IC receives the refresh rate adjustment notification sent by the SOC of the electronic device, the screen IC may adjust the refresh rate of the screen image to the adjusted refresh rate of the screen image included in the refresh rate adjustment notification.

The adjusted refresh rate of the screen image may be the same as the frame drawing rate of the screen image on the electronic device. For example, the adjusted refresh rate of the screen image may be a refresh rate corresponding to the AOD mode. For example, when the electronic device projects the screen by using the YourPhone screen projection function, and the screen of the electronic device displays the specific static interface, the frame drawing rate of the screen image on the electronic device is usually 30 Hz, so that the adjusted refresh rate of the screen image can be 30 Hz.

It should be noted that, when the SOC of the electronic device determines that the ratio of the area that needs to be displayed on the screen of the electronic device to all the display areas of the screen is greater than the preset threshold, the electronic device may not adjust the power supply manner of the screen, or the electronic device may not adjust the refresh rate of the screen image. However, when the electronic device does not adjust the refresh rate of the screen image, power consumption of the electronic device generated during screen projection is relatively high.

In some examples, the refresh rate adjustment notification may be a vertical synchronization (vertical synchronization, Vsync) signal. This is not limited in this embodiment of this application.

S406: The screen IC of the electronic device receives the refresh rate adjustment notification, and adjusts the refresh rate of the screen image based on the refresh rate adjustment notification.

After the screen IC receives the refresh rate adjustment notification sent by the SOC of the electronic device, the screen IC may adjust the refresh rate of the screen image, that is, the screen IC may reduce the refresh rate of the screen image based on the refresh rate adjustment notification, thereby reducing power consumption of the electronic device generated during screen projection.

In some examples, when the refresh rate adjustment notification includes the adjusted refresh rate of the screen image, the screen IC may adjust the refresh rate of the screen image to the adjusted refresh rate of the screen image included in the refresh rate adjustment notification. It should be noted that, after the screen IC of the electronic device receives the refresh rate adjustment notification, adjusting the refresh rate of the screen image is adjusting, to the adjusted refresh rate of the screen image, both software and hardware corresponding to the screen IC.

S407: The SOC of the electronic device sends a refresh rate adjustment notification to a screen IC, where the refresh rate adjustment notification includes a refresh rate corresponding to the AOD mode.

When the SOC of the electronic device determines that the ratio of the area that needs to be displayed on the screen of the electronic device to all the display areas of the screen is less than the preset threshold, the electronic device may adjust a working mode of the screen IC to reduce the refresh rate of the screen image, for example, adjust the working mode of the screen IC to the AOD mode, thereby reducing power consumption of the electronic device generated during screen projection.

That the electronic device adjusts the working mode of the screen IC to the AOD mode may include: The electronic device adjusts the refresh rate of the screen image to the refresh rate corresponding to the AOD mode; and then, the electronic device adjusts the working mode of the screen IC to the AOD working mode.

In some examples, that the electronic device adjusts the refresh rate of the screen image may include: The SOC of the electronic device may send the refresh rate adjustment notification (which may be referred to as a first refresh rate adjustment notification in this embodiment of this application) to the screen IC. The refresh rate adjustment notification may be used to indicate the screen IC to adjust the refresh rate of the screen image. After the screen IC receives the refresh rate adjustment notification sent by the SOC of the electronic device, the screen IC may adjust the refresh rate of the screen image, that is, the screen IC may reduce the refresh rate of the screen image based on the refresh rate adjustment notification.

In some examples, the refresh rate adjustment notification may further include an adjusted refresh rate of the screen image. The adjusted refresh rate of the screen image (which may be referred to as a second refresh rate in this embodiment of this application) may be a corresponding refresh rate used for the screen image when the working mode of the screen of the electronic device is the AOD mode.

The corresponding refresh rate used for the screen image when the working mode of the screen of the electronic device is the AOD mode is 30 Hz, that is, the adjusted refresh rate of the screen image is the same as the frame drawing rate of the screen image on the electronic device. For example, when the electronic device projects the screen by using the YourPhone screen projection function, and the screen of the electronic device displays the specific static interface, the frame drawing rate of the screen image on the electronic device is usually 30 Hz, and the corresponding refresh rate used for the screen image when the working mode of the screen of the electronic device is the AOD mode is the same as the frame drawing rate of the screen image, and both are 30 Hz.

S408: The screen IC of the electronic device receives the refresh rate adjustment notification, and adjusts, based on the refresh rate adjustment notification, the refresh rate of the screen image to the refresh rate corresponding to the AOD mode.

After the screen IC receives the refresh rate adjustment notification sent by the SOC of the electronic device, the screen IC may adjust, based on the refresh rate adjustment notification, the refresh rate of the screen image to the refresh rate corresponding to the AOD mode, thereby reducing power consumption of the electronic device generated during screen projection.

S409: The SOC of the electronic device sends a working mode adjustment notification to the screen IC.

When the SOC of the electronic device determines that the ratio of the area that needs to be displayed on the screen of the electronic device to all the display areas of the screen is less than the preset threshold, the electronic device not only can adjust the refresh rate of the screen image, but also can adjust the power supply manner of the screen, that is, the electronic device can adjust the working mode of the screen.

The working mode of the screen of the electronic device is the working mode of the screen IC, and may include a normal mode and the AOD mode. When the working mode of the screen of the electronic device is the normal mode, the screen IC of the electronic device needs to supply power to all the display areas of the screen. When the working mode of the screen of the electronic device is the AOD mode, the screen IC of the electronic device may supply power to the area that needs to be displayed on the screen.

That the electronic device adjusts the power supply manner of the screen may include: The SOC of the electronic device sends the working mode adjustment notification to the screen IC. The working mode adjustment notification is used to indicate to adjust the working mode of the screen IC to the AOD mode. After the screen IC receives the working mode adjustment notification sent by the SOC of the electronic device, the screen IC may adjust the working mode to the AOD mode based on the working mode adjustment notification.

It should be noted that, after the electronic device successfully projects the screen by using the YourPhone screen projection function, when the screen of the electronic device displays the specific static interface and the prompt window, the working mode of the screen IC of the electronic device is the normal mode, that is, the screen IC of the electronic device needs to supply power to all the display areas of the screen. However, when the screen of the electronic device displays the specific static interface, for example, a pure black interface, the screen IC of the electronic device only needs to supply power to the area that needs to be displayed on the screen. Therefore, the working mode of the screen IC of the electronic device may be adjusted to the AOD mode, so that the screen IC of the electronic device can supply power only to the display area corresponding to the prompt window to reduce current for supplying power to the screen by the screen IC of the electronic device, thereby reducing power consumption of the electronic device generated during screen projection. It can be learned through statistics collection that, after the working mode of the screen IC of the electronic device is adjusted to the AOD mode, the current for supplying power to the screen by the screen IC of the electronic device can be reduced by 40 mA-50 mA.

S410: The screen IC of the electronic device adjusts the working mode of the screen to the AOD mode based on the working mode adjustment notification.

After the screen IC receives the working mode adjustment notification sent by the SOC of the electronic device, the screen IC may adjust the working mode to the AOD mode based on the working mode adjustment notification, thereby reducing power consumption of the electronic device generated during screen projection.

For ease of understanding, the power consumption control method provided in the embodiments of this application is described in a time sequence with reference to FIG. 5 by using an example in which an electronic device projects a screen by using a YourPhone screen projection function, a specific static interface displayed by the electronic device after the screen projection is a pure black interface, and a working mode of the screen of the electronic device is adjusted to an AOD mode to reduce a refresh rate of a screen image on the electronic device.

The electronic device projects the screen by using the YourPhone screen projection function. After the electronic device successfully projects the screen, the electronic device displays a pure black interface and a prompt window. A ratio of a display area corresponding to the prompt window to a display area of the screen of the electronic device is less than ⅓. In this case, the refresh rate of the screen image on the electronic device is 60 Hz, a frame drawing rate of the screen image on the electronic device is 30 Hz, and the working mode of the screen (that is, a screen IC) of the electronic device is a normal mode, that is, the screen IC of the electronic device needs to supply power to all display areas of the screen. When the working mode of the screen of the electronic device is the AOD mode, the refresh rate of the screen image on the electronic device is 30 Hz.

After the electronic device displays the pure black interface and the prompt window, a SOC of the electronic device performs layer identification, that is, the SOC of the electronic device identifies a name of a top layer of the current display interface.

After the SOC of the electronic device identifies the name of the top layer of the current display interface, the SOC of the electronic device determines that the top layer is a specific layer. To be specific, the SOC of the electronic device may traverse a top layer whitelist, and when the SOC of the electronic device determines that the name of the top layer of the current display interface exists in the top layer whitelist, the SOC of the electronic device may determine that the top layer of the current display interface is the specific layer, that is, the SOC of the electronic device may determine that a ratio of an area that needs to be displayed at the top layer of the current display interface to the display area of the screen of the electronic device is less than ⅓.

After the SOC of the electronic device determines that the top layer is the specific layer, the SOC of the electronic device may send a refresh rate adjustment notification to the screen IC. The refresh rate adjustment notification is used to indicate the screen IC to adjust the refresh rate to a refresh rate corresponding to the screen IC when the working mode of the screen is the AOD mode.

After the screen IC of the electronic device receives the refresh rate adjustment notification sent by the SOC, the screen IC may adjust the refresh rate to the refresh rate corresponding to the screen IC when the working mode of the screen is the AOD mode. The refresh rate of the screen image on the electronic device is adjusted to the refresh rate corresponding to the AOD mode, and the refresh rate of the screen image on the electronic device is the same as the frame drawing rate of the screen image on the electronic device, which not only can meet a display requirement of the screen of the electronic device, but also can avoid relatively high power consumption of the electronic device caused by a relatively high refresh rate of the screen image on the electronic device.

After the SOC of the electronic device sends the refresh rate adjustment notification to the screen IC, and the screen IC adjusts the refresh rate to the refresh rate corresponding to the screen IC when the working mode of the screen is the AOD mode, the SOC of the electronic device may send a working mode adjustment notification to the screen IC. The working mode adjustment notification is used to indicate the screen IC of the electronic device to adjust the working mode from the normal mode to the AOD mode.

After the screen IC of the electronic device adjusts the working mode to the AOD mode, the screen IC of the electronic device may supply power to all the display areas of the screen, that is, the screen IC of the electronic device may supply power to the display area corresponding to the prompt window, and may not supply power to a display area other than the display area corresponding to the prompt window, thereby further reducing power consumption of the electronic device generated during screen projection.

It should be noted that, the solution of this application may be applied to a scenario in which an electronic device projects a screen by using a YourPhone screen projection function. To be specific, when the electronic device projects the screen by using the YourPhone screen projection function, a refresh rate of a screen image on the electronic device is 60 Hz, a frame drawing rate of the screen image on the electronic device is 30 Hz, and when a ratio of a to-bedisplayed area of the electronic device to all display areas of the screen is less than a preset threshold (for example, ⅓), the electronic device may adjust a working mode of the screen of the electronic device to an AOD mode, so that not only the refresh rate of the screen image on the electronic device can be reduced, but also the screen of the electronic device can supply power to the to-be-displayed area, and does not need to supply power to the entire display area of the screen of the electronic device, thereby reducing power consumption of the electronic device.

The solution of this application may be further applied to another scenario. For example, in another scenario, provided that a frame drawing rate of a screen image on an electronic device is 30 Hz, and a ratio of a to-be-displayed area of the electronic device to all display areas of a screen is less than a preset threshold (for example, ⅓), the electronic device can also adjust a working mode of the screen of the electronic device to an AOD mode, so that not only a refresh rate of the screen image on the electronic device can be reduced, but also the screen of the electronic device can supply power to the to-be-displayed area, and does not need to supply power to the entire display area of the screen of the electronic device, thereby reducing power consumption of the electronic device.

In the solution of this application, when an electronic device projects a screen by using a screen projection function (for example, YourPhone), a refresh rate of a screen image on the electronic device can be reduced. For example, a working mode of the screen of the electronic device is adjusted to reduce the refresh rate of the screen image on the electronic device. For example, the working mode of the screen of the electronic device is adjusted to an always on display (always on display, AOD) mode to reduce power consumption of the electronic device generated during screen projection.

When the electronic device projects the screen by using the screen projection function (for example, YourPhone), the working mode of the screen of the electronic device is adjusted to the AOD mode, and the refresh rate of the screen image on the electronic device is the same as the frame drawing rate of the screen image on the electronic device, which not only can meet a display requirement of the screen of the electronic device, but also can avoid relatively high power consumption of the electronic device caused by a relatively high refresh rate of the screen image on the electronic device.

When the electronic device projects the screen by using the screen projection function (for example, YourPhone), and the screen of the electronic device displays a pure black interface and a prompt window, the screen of the electronic device may supply power to a display area in which the prompt window is located, and does not need to supply power to the entire display area of the screen of the electronic device, thereby further reducing power consumption of the electronic device.

For ease of understanding, the power consumption control method provided in the embodiments of this application is described below with reference to FIG. 6. As shown in FIG. 6, the power consumption control method may include the following S601-S606.

S601: An electronic device projects a screen by using a screen projection application.

The screen projection application may be used to send, to a screen projection destination electronic device, data corresponding to a current display interface of the electronic device, so that a screen of the screen projection destination electronic device can display the current display interface of the electronic device. The screen projection application may be a YourPhone screen projection application, or the screen projection application may be another screen projection application, for example, an application such as a video playing application that includes a screen projection function. This is not limited in this embodiment of this application.

In some examples, that the electronic device projects a screen by using a screen projection application may include: When the electronic device receives an operation of triggering, by a user, a control corresponding to the screen projection application for screen projection, as a response, the electronic device may send, to the screen projection destination electronic device, the data corresponding to the current display interface.

After the electronic device successfully projects the screen by using the screen projection application, that is, after the screen of the screen projection destination electronic device can display content (such as an application, an image, a notification, or an SMS message) corresponding to the current display interface of the electronic device, the user can obtain or view an application, an image, a notification, or an SMS message in the electronic device by using the screen projection destination electronic device.

It should be noted that, before the electronic device projects the screen by using the screen projection application, the electronic device may establish a connection such as a wireless connection to the screen projection destination electronic device.

S602: The electronic device displays a first interface, where the first interface includes a to-be-displayed area, and a working mode of the screen of the electronic device is a normal mode.

The electronic device may display the first interface after the electronic device successfully projects the screen by using the screen projection application. The first interface may include the to-be-displayed area. The to-be-displayed area is an area that needs to be displayed in the first interface, and may also be understood as an area to which the electronic device needs to supply power in the first interface.

The first interface may be a static interface. For example, the first interface may be a pure black interface. When the first interface is the pure black interface, the electronic device may not supply power to the screen.

In some examples, the first interface may include a prompt window, and the prompt window may be used to prompt the user to touch the screen to enable the screen to display the content on the electronic device. For example, the prompt window may include words "touch the screen to light up the screen for display". In other words, the to-be-displayed area in the first interface may be used to display the prompt window.

When the electronic device displays the first interface, a refresh rate of a screen image on the electronic device may be a first refresh rate, where the first refresh rate is usually 60 Hz; and a frame drawing rate of the screen image on the electronic device is a first frame drawing rate, where the first frame drawing rate is usually 30 Hz. In other words, the first refresh rate is greater than the first frame drawing rate.

When the electronic device displays the first interface, the working mode of the screen of the electronic device is the normal mode, that is, the electronic device needs to supply power to all display areas of the screen.

It should be noted that the working mode of the screen of the electronic device may further include an AOD mode, that is, the electronic device may supply power to a partial display area of the screen. When the working mode of the screen of the electronic device is the AOD mode, a ratio of an area in which the electronic device supplies power the screen to all the display areas of the screen is less than ⅓, and the refresh rate of the screen image on the electronic device is 30 Hz. In other words, when the working mode of the screen of the electronic device is the AOD mode, the electronic device supplies power to a maximum of ⅓ of all the display areas of the screen.

S603: The electronic device determines whether a ratio of the to-be-displayed area to all the display areas of the screen is less than a preset threshold.

After the electronic device displays the first interface, the electronic device may determine whether a ratio of an area (that is, the to-be-displayed area) that needs to be displayed in the first interface to all the display areas of the screen is less than the preset threshold. When the electronic device determines that the ratio of the area that needs to be displayed in the first interface to all the display areas of the screen is greater than the preset threshold, the electronic device may adjust the refresh rate of the screen image, that is, the electronic device may perform the following S604. When the electronic device determines that the ratio of the area that needs to be displayed in the first interface to all the display areas of the screen is less than the preset threshold, the electronic device may adjust the refresh rate of the screen image, and adjust the working mode of the screen to the AOD mode, so as to adjust a power supply manner of the screen, that is, the electronic device may perform the following S605.

It should be noted that, when the electronic device determines that the ratio of the area that needs to be displayed in the first interface to all the display areas of the screen is equal to the preset threshold, the electronic device may adjust the refresh rate of the screen image, that is, the electronic device may perform the following S604; or the electronic device may adjust the refresh rate of the screen image, and adjust the working mode of the screen to the AOD mode, so as to adjust the power supply manner of the screen, that is, the electronic device may perform the following S605. This is not limited in this embodiment of this application.

The preset threshold may be set based on an actual situation. This is not limited in this embodiment of this application. For example, the preset threshold may be ⅓. To be specific, when determining that the area that needs to be displayed on the screen of the electronic device is less than ⅓ of the entire display area of the screen of the electronic device, a SOC of the electronic device may adjust the working mode of the screen to the AOD mode.

In some examples, that the electronic device determines whether a ratio of an area that needs to be displayed in the first interface to all the display areas of the screen is less than the preset threshold may include: The electronic device determines a name of a top layer corresponding to the first interface; after determining the name of the top layer corresponding to the first interface, the electronic device may determine, based on the name of the top layer corresponding to the first interface and a top layer whitelist, whether the ratio of the area that needs to be displayed in the first interface to all the display areas of the screen is less than the preset threshold; when the top layer whitelist includes the name of the top layer corresponding to the first interface, the electronic device may determine that the ratio of the area that needs to be displayed in the first interface to all the display areas of the screen is less than the preset threshold; and when the top layer whitelist does not include the name of the top layer corresponding to the first interface, the electronic device may determine that the ratio of the area that needs to be displayed in the first interface to all the display areas of the screen is not less than the preset threshold.

The top layer whitelist may include a plurality of top layer names (which may be referred to as first top layer names in this embodiment of this application). Different top layer names may correspond to different display interfaces, or different top layer names may correspond to different applications. The top layer whitelist may be preset in the electronic device. In addition, a display area corresponding to a top layer corresponding to the top layer name included in the top layer whitelist is less than the preset threshold.

In this embodiment of this application, for that the electronic device determines whether the ratio of the area that needs to be displayed in the first interface to all the display areas of the screen is less than the preset threshold, refer to the foregoing S403-S404. Details are not described herein again in this embodiment of this application.

S604: The electronic device adjusts the refresh rate of the screen image from the first refresh rate to a third refresh rate, where the third refresh rate is less than the first refresh rate.

When the electronic device determines that the ratio of the area (that is, the to-be-displayed area) that needs to be displayed in the first interface to all the display areas of the screen is not less than the preset threshold, the area that needs to be displayed in the first interface is relatively large, that is, an area in which the electronic device needs to supply power to the screen is relatively large. When the area in which the electronic device needs to supply power to the screen is relatively large, the working mode of the screen of the electronic device may be the normal mode, that is, the electronic device needs to supply power to all display areas of the screen.

In other words, when the electronic device determines that the ratio of the area that needs to be displayed in the first interface to all the display areas of the screen is not less than the preset threshold, the electronic device may not adjust the working mode of the screen. However, because the refresh rate of the screen image on the electronic device is greater than the frame drawing rate on the screen image on the electronic device, that is, the first refresh rate is greater than the first frame drawing rate, power consumption of the electronic device is relatively high. Therefore, the electronic device may adjust the refresh rate of the screen image, thereby reducing power consumption of the electronic device generated during screen projection.

That the electronic device adjusts the refresh rate of the screen image may include: The electronic device adjusts the refresh rate of the screen image from the first refresh rate to the third refresh rate, where the third refresh rate is less than the first refresh rate.

When the first refresh rate is 60 Hz and the first frame drawing rate is 30 Hz, the third refresh rate may be the same as the first frame drawing rate, that is, 30 Hz. In other words, the third refresh rate may also be the same as a refresh rate used for the screen image on the electronic device when the working mode of the screen of the electronic device is the AOD mode.

In this embodiment of this application, for that the electronic device adjusts the refresh rate of the screen image from the first refresh rate to the third refresh rate, where the third refresh rate is less than the first refresh rate, refer to the foregoing S405-S406. Details are not described herein again in this embodiment of this application.

S605: The electronic device adjusts the refresh rate of the screen image from the first refresh rate to a second refresh rate, where the second refresh rate is less than the first refresh rate, and the second refresh rate is a refresh rate corresponding to the AOD mode.

When the electronic device determines that the ratio of the area that needs to be displayed in the first interface to all the display areas of the screen is less than the preset threshold, the area that needs to be displayed in the first interface is relatively small, that is, an area in which the electronic device needs to supply power to the screen is relatively small. When the area in which the electronic device needs to supply power to the screen is relatively small, the working mode of the screen of the electronic device may be adjusted from the normal mode to the AOD mode, that is, the electronic device may supply power to a partial display area of the screen, where a ratio of the partial display area to all the display areas of the screen is less than ⅓.

In other words, when the electronic device determines that the ratio of the area that needs to be displayed in the first interface to all the display areas of the screen is less than the preset threshold, the electronic device may adjust the working mode of the screen, that is, adjust the working mode from the normal mode to the AOD mode. When the working mode of the screen of the electronic device is the AOD mode, the refresh rate of the screen image on the electronic device is 30 Hz. Therefore, the electronic device may first adjust the refresh rate of the screen image to the refresh rate corresponding to the AOD mode, and then, adjust the working mode of the screen of the electronic device to the AOD mode, thereby reducing power consumption of the electronic device generated during screen projection.

That the electronic device adjusts the refresh rate of the screen image to the refresh rate corresponding to the AOD mode may include: The electronic device adjusts the refresh rate of the screen image from the first refresh rate to the second refresh rate, where the second refresh rate is less than the first refresh rate. The second refresh rate is a refresh rate used for the screen image on the electronic device when the working mode of the screen of the electronic device is the AOD mode. The second refresh rate is usually 30 Hz. In other words, the second refresh rate may be the same as the first frame drawing rate.

In this embodiment of this application, for that the electronic device adjusts the refresh rate of the screen image from the first refresh rate to the second refresh rate, refer to the foregoing S407-S408. Details are not described herein again in this embodiment of this application.

S606: The electronic device adjusts the working mode of the screen from the normal mode to the AOD mode.

After the electronic device adjusts the refresh rate of the screen image from the first refresh rate to the second refresh rate, that is, adjusts the refresh rate from the first refresh rate to the refresh rate corresponding to the AOD mode, the electronic device may adjust the working mode of the screen from the normal mode to the AOD mode.

In this embodiment of this application, for that the electronic device adjusts the working mode of the screen from the normal mode to the AOD mode, refer to the foregoing S409-S410. Details are not described herein again in this embodiment of this application.

In the solution of this application, when the electronic device projects the screen by using the screen projection application (that is, the screen projection function), the electronic device may display the first interface. After the electronic device displays the first interface (such as a pure black interface) and the prompt window, the electronic device may determine whether the ratio of the area that needs to be displayed in the first interface to all the display areas of the screen is less than the preset threshold. When the electronic device can determine that the ratio of the area that needs to be displayed in the first interface to all the display areas of the screen is not less than the preset threshold, the electronic device may adjust the refresh rate of the screen image, thereby reducing power consumption of the electronic device.

When the electronic device can determine that the ratio of the area that needs to be displayed in the first interface to all the display areas of the screen is less than the preset threshold, the electronic device may adjust the working mode of the screen to the AOD mode, which not only can adjust the refresh rate of the screen image, but also can adjust a power supply manner of a display area of the screen, thereby reducing power consumption of the electronic device.

Corresponding to the method in the foregoing embodiments, an embodiment of this application further provides a power consumption control apparatus. The power consumption control apparatus may be applied to an electronic device, and is configured to implement the method in the foregoing embodiments. A function of the power consumption control apparatus may be implemented by using hardware, or may be implemented by executing corresponding software by hardware. The hardware or the software includes one or more modules corresponding to the foregoing functions.

Figure 7:
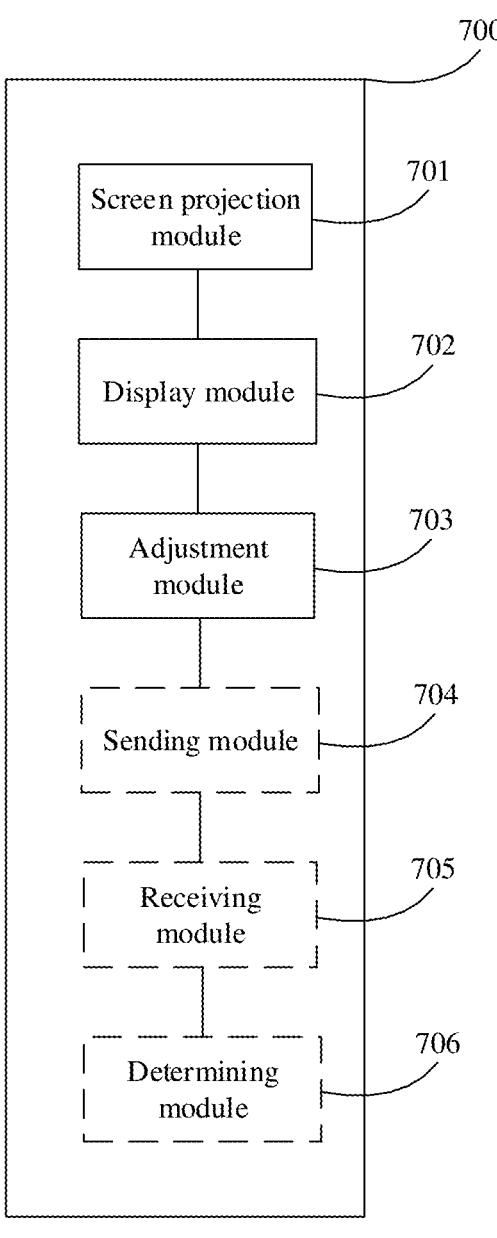
FIG. 7 is a schematic diagram of a structure of a power consumption control apparatus according to an embodiment of this application.

For example, FIG. 7 is a schematic diagram of a structure of a power consumption control apparatus 700. As shown in FIG. 7, the power consumption control apparatus 700 may include a screen projection module 701, a display module 702, an adjustment module 703, and the like.

The screen projection module 701 may be configured to project a screen by using a screen projection application.

The display module 702 may be used to display a first interface, where the first interface includes a to-be-displayed area, a working mode of the screen of the electronic device is a normal mode, and when the working mode of the screen is the normal mode, the electronic device supplies power to all display areas of the screen, and a refresh rate of a screen image on the electronic device is a first refresh rate.

The adjustment module 703 may be configured to adjust the working mode of the screen to an always on display AOD mode when a ratio of the to-be-displayed area to all the display areas of the screen is less than a preset threshold, where when the working mode of the screen is the AOD mode, the electronic device supplies power to the to-be-displayed area, the refresh rate of the screen image on the electronic device is a second refresh rate, and the second refresh rate is less than the first refresh rate.

In a possible implementation, the adjustment module 703 may be configured to adjust the refresh rate of the screen image from the first refresh rate to the second refresh rate.

The adjustment module 703 may be further configured to adjust the working mode of the screen from the normal mode to the AOD mode.

In a possible implementation, when the working mode of the screen is the normal mode, a frame drawing rate of the screen image on the electronic device is a first frame drawing rate, where the first refresh rate is greater than the first frame drawing rate, and the second refresh rate is the same as the first frame drawing rate.

In a possible implementation, the power consumption control apparatus 700 may further include a sending module 704 and a receiving module 705.

The sending module 704 may be configured to send a first refresh rate adjustment notification to a screen IC, where the first refresh rate adjustment notification includes the second refresh rate.

The receiving module 705 may be configured to receive the first refresh rate adjustment notification.

The adjustment module 703 may be configured to adjust the refresh rate of the screen image from the first refresh rate to the second refresh rate based on the first refresh rate adjustment notification received by the receiving module.

The sending module 704 may be further configured to send a working mode adjustment notification to the screen IC, where the working mode adjustment notification is used to indicate the screen IC to adjust the working mode of the screen to the AOD mode.

The receiving module 705 may be configured to receive the working mode adjustment notification.

The adjustment module 703 may be configured to adjust the working mode of the screen to the AOD mode based on the working mode adjustment notification received by the receiving module.

In a possible implementation, the power consumption control apparatus 700 may further include a determining module 706.

The determining module 706 may be configured to determine a name of a top layer corresponding to the first interface.

The determining module 706 may be further configured to determine, based on the name of the top layer corresponding to the first interface and a top layer whitelist, that the ratio of the to-be-displayed area to all the display areas of the screen is less than the preset threshold, where the top layer whitelist includes a plurality of first top layer names, and a ratio of a to-be-displayed area in an interface corresponding to the first top layer name to all the display areas of the screen is less than the preset threshold.

In a possible implementation, the adjustment module 703 may be further configured to adjust the refresh rate of the screen image from the first refresh rate to a third refresh rate when the ratio of the to-be-displayed area to all the display areas of the screen is greater than the preset threshold, where the third refresh rate is less than the first refresh rate.

In a possible implementation, the first interface is a static interface.

In a possible implementation, the first interface is a pure black static interface.

In a possible implementation, the first interface includes a prompt window, where the prompt window is used to prompt a user to touch the screen to enable the screen to display content on the electronic device, and the to-be-displayed area is used to display the prompt window.

It should be understood that division of units or modules (referred to as units in the following) in the apparatus is merely logical function division. In actual implementation, all or some of the units or modules may be integrated into one physical entity, or may be physically separated. In addition, all the units in the apparatus may be implemented in a form of software invoked by a processing element, or may be implemented in a form of hardware; or some units may be implemented in a form of software invoked by a processing element, and some units are implemented in a form of hardware.

For example, the units may be separately disposed processing elements, or may be integrated into a chip in the apparatus for implementation. In addition, the units may be stored in a memory in a form of a program, and invoked by a processing element of the apparatus to implement a function of the unit. In addition, all or some of these units may be integrated together, or may be implemented independently. The processing element described herein may also be referred to as a processor, and may be an integrated circuit that has a signal processing capability. In an implementation process, the steps in the foregoing methods or the foregoing units may be implemented by using a hardware integrated logic circuit in a processor element, or may be implemented in a form of software invoked by the processing element.

In one example, the units in the foregoing apparatus may be one or more integrated circuits configured to implement the foregoing methods, for example, one or more ASICs, one or more DSPs, one or more FPGAs, or a combination of at least two of these integrated circuit forms.

For another example, when the units in the apparatus may be implemented in a form of scheduling a program by using the processing element, the processing element may be a general-purpose processor, for example, a CPU or another processor that can invoke the program. For another example, these units may be integrated together and implemented in a form of a system on chip SOC.

In an implementation, the units in the foregoing apparatus that implement corresponding steps in the foregoing methods may be implemented in a form of scheduling a program by using the processing element. For example, the apparatus may include a processing element and a storage element, and the processing element invokes a program stored in the storage element to perform the methods described in the foregoing method embodiments. The storage element may be a storage element that is located on a same chip as the processing element, that is, an on-chip storage element.

In another implementation, the program used to perform the foregoing methods may be on a storage element that is located on a different chip from the processing element, that is, an off-chip storage element. In this case, the processing element invokes or loads the program from the off-chip storage element onto the on-chip storage element, to invoke and perform the methods described in the foregoing method embodiments.

For example, an embodiment of this application may further provide an apparatus such as an electronic device, which may include a processor and a memory configured to store instructions that can be executed by the processor. The processor is configured to enable, when executing the instructions, the electronic device to implement the power consumption control method described in the foregoing embodiments. The memory may be located inside the electronic device or may be located outside the electronic device. In addition, there are one or more processors.

In still another implementation, the units in the apparatus that implement the steps in the foregoing methods may be configured as one or more processing elements, and these processing elements may be disposed on the corresponding electronic device described above. The processing elements herein may be integrated circuits, such as one or more ASICs, one or more DSPs, one or more FPGAs, or a combination of these types of integrated circuits. These integrated circuits may be integrated together to form a chip.

For example, an embodiment of this application further provides a chip, and the chip may be applied to the foregoing electronic device. The chip includes one or more interface circuits and one or more processors. The interface circuit and the processor are interconnected by using a line. The processor receives computer instructions from the memory of the electronic device through the interface circuit and executes the computer instructions, to implement the methods described in the foregoing method embodiments.

An embodiment of this application further provides a computer-readable storage medium, and the computer-readable storage medium stores computer program instructions. When the computer program instructions are executed by an electronic device, the electronic device is enabled to implement the foregoing power consumption control method.

An embodiment of this application further provides a computer program product, including computer instructions that are run in the foregoing electronic device. When the computer instructions are run in the electronic device, the electronic device is enabled to implement the foregoing power consumption control method. Through the descriptions of the foregoing implementations, a person skilled in the art may clearly understand that, for the purpose of convenient and brief description, only division of the foregoing functional modules is used as an example for description. In an actual application, the functions may be allocated to and completed by different functional modules based on a requirement. In other words, an internal structure of the apparatus is divided into different functional modules, to complete all or some of the functions described above.

In the several embodiments provided in this application, it should be understood that the disclosed apparatus and method may be implemented in other manners. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in an electrical form, a mechanical form, or another form.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions in the embodiments.

In addition, the functional units in the embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product, for example, a program. The software product is stored in a program product, for example, a computer-readable storage medium, including several instructions for instructing a device (which may be a single-chip microcomputer, a chip, or the like) or a processor (processor) to perform all or some of the steps of the methods described in the embodiments of this application. The storage medium includes any medium that can store program code, for example, a USB flash drive, a removable hard disk, a ROM, a RAM, a magnetic disk, or an optical disc.

For example, an embodiment of this application may further provide a computer-readable storage medium, and the computer-readable storage medium stores computer program instructions. When the computer program instructions are executed by an electronic device, the electronic device is enabled to implement the power consumption control method described in the foregoing method embodiments.

The foregoing descriptions are merely specific implementations of this application, but are not intended to limit the protection scope of this application. Any change or replacement made within the technical scope disclosed in this application shall fall within the protection scope of this application. Therefore, the protection scope of this application shall be subject to the protection scope of the claims.

The invention claimed is:

1. A power consumption control method, applied to a first electronic device, wherein the method comprises:
projecting, by the first electronic device, a screen onto a second electronic device;
displaying, by the first electronic device a first interface wherein a refresh rate of the screen is a first refresh rate;
after projecting the screen onto the second electronic device, reducing, by the first electronic device, power supplied to a screen integrated circuit (IC); and
adjusting, by the first electronic device, a refresh rate of the screen from the first refresh rate to a second refresh rate, wherein the second refresh rate is less than the first refresh rate,
wherein the first interface comprises a to-be-displayed area, the first interface is a static interface, a working mode of the screen of the first electronic device is a normal mode, and when the working mode of the screen is the normal mode, the first electronic device supplies power to all display areas of the screen, and the refresh rate of the screen of the first electronic device is the first refresh rate;
and the reducing, by the first electronic device, power supplied to a screen integrated circuit (IC) comprises:
adjusting, by the first electronic device, the working mode of the screen to an always on display (AOD) mode when a ratio of the to-be-displayed area to all display areas of the screen is less than a preset threshold, wherein when the working mode of the screen is the AOD mode, the first electronic device supplies power to the to-be-displayed area, and the refresh rate of a screen image on the first electronic device is a second refresh rate.

2. The method according to claim 1, wherein the adjusting, by the first electronic device, the working mode of the screen to an always on display (AOD) mode comprises:
adjusting, by the first electronic device, the refresh rate of the screen image from the first refresh rate to the second refresh rate; and
adjusting, by the first electronic device, the working mode of the screen from the normal mode to the AOD mode.

3. The method according to claim 1, wherein when the working mode of the screen is the normal mode, a frame drawing rate of the screen on the first electronic device is a first frame drawing rate, and the first refresh rate is greater than the first frame drawing rate; and
the second refresh rate is the same as the first frame drawing rate.

4. The method according to claim 1, wherein the first electronic device comprises a system on chip (SOC) and a screen IC, and the adjusting, by the first electronic device, the refresh rate of the screen from the first refresh rate to the second refresh rate comprises:
sending, by the SOC, a first refresh rate adjustment notification to the screen IC, wherein the first refresh rate adjustment notification comprises the second refresh rate;
receiving, by the screen IC, the first refresh rate adjustment notification, and adjusting the refresh rate of the screen image from the first refresh rate to the second refresh rate based on the first refresh rate adjustment notification;
sending, by the SOC, a working mode adjustment notification to the screen IC, wherein the working mode adjustment notification is used to indicate the screen IC to adjust the working mode of the screen to the AOD mode; and
receiving, by the screen IC, the working mode adjustment notification, and adjusting the working mode of the screen to the AOD mode based on the working mode adjustment notification.

5. The method according to claim 1, wherein the determining, by the first electronic device, that a ratio of the to-be-displayed area to all the display areas of the screen is less than a preset threshold comprises:
determining, by a system on chip (SOC), a name of a top layer corresponding to the first interface; and
determining, by the SOC based on the name of the top layer corresponding to the first interface and a top layer whitelist, that the ratio of the to-be-displayed area to all the display areas of the screen is less than the preset threshold, wherein the top layer whitelist comprises a plurality of first top layer names, and a ratio of a to-be-displayed area in an interface corresponding to the first top layer name to all the display areas of the screen is less than the preset threshold.

6. The method according to claim 1, wherein when the ratio of the to-be-displayed area to all the display areas of the screen is greater than the preset threshold, the first electronic device adjusts the refresh rate of the screen from the first refresh rate to a third refresh rate, wherein the third refresh rate is less than the first refresh rate.

7. The method according to claim 1, wherein the first interface is a pure black static interface.

8. The method according to claim 1, wherein the first interface comprises a prompt window, the prompt window is used to prompt a user to touch the screen to enable the screen to display content on the first electronic device, and the to-be-displayed area is used to display the prompt window.

9. A non-transitory machine-readable storage medium, storing computer program instructions; and
when the computer program instructions are executed by a first electronic device, the first electronic device is enabled to perform operations comprising:
projecting a screen onto a second electronic device;
displaying a first interface, wherein a refresh rate of the screen is a first refresh rate;
after projecting the screen onto the second electronic device, reducing power supplied to a screen integrated circuit (IC); and
adjusting a refresh rate of the screen from the first refresh rate to a second refresh rate, wherein the second refresh rate is less than the first refresh rate,
wherein the first interface comprises a to-be-displayed area, the first interface is a static interface, a working mode of the screen of the first electronic device is a normal mode, and when the working mode of the screen is the normal mode, the first electronic device supplies power to all display areas of the screen, and the refresh rate of the screen of the first electronic device is the first refresh rate; and the reducing power supplied to a screen integrated circuit (IC) comprises:

adjusting the working mode of the screen to an always on display (AOD) mode when a ratio of the to-be displayed area to all the display areas of the screen is less than a preset threshold, wherein when the working mode of the screen is the AOD mode, the first electronic device supplies power to the to-be-displayed area, and the refresh rate of a screen image on the first electronic device is a second refresh rate.

10. A first electronic device, wherein the first electronic device comprises a processor and a memory configured to store instructions that, when executed by the processor, enable the first electronic device to perform operations comprising:

projecting a screen onto a second electronic device;

displaying a first interface, wherein a refresh rate of the screen is a first refresh rate;

after projecting the screen onto the second electronic device, reducing power supplied to a screen integrated circuit (IC); and adjusting a refresh rate of the screen from the first refresh rate to a second refresh rate, wherein the second refresh rate is less than the first refresh rate, wherein the first interface comprises a to-be-displayed area, the first interface is a static interface, a working mode of the screen of the first electronic device is a normal mode, and when the working mode of the screen is the normal mode, the first electronic device supplies power to all display areas of the screen, and the refresh rate of the screen of the first electronic device is the first refresh rate; and the reducing power supplied to a screen integrated circuit (IC) comprises:

adjusting the working mode of the screen to an always on display (AOD) mode when a ratio of the to-be-dis-played area to all the display areas of the screen is less than a preset threshold, wherein when the working mode of the screen is the AOD mode, the first electronic device supplies power to the to-be-displayed area, and the refresh rate of a screen image on the first electronic device is a second refresh rate.

11. The first electronic device according to claim 10, wherein the adjusting, by the first electronic device, the working mode of the screen to an always on display (AOD) mode comprises:

adjusting, by the first electronic device, the refresh rate of the screen image from the first refresh rate to the second refresh rate; and adjusting, by the first electronic device, the working mode of the screen from the normal mode to the AOD mode.

12. The first electronic device according to claim 10, wherein when the working mode of the screen is the normal mode, a frame drawing rate of the screen on the first electronic device is a first frame drawing rate, and the first refresh rate is greater than the first frame drawing rate; and the second refresh rate is the same as the first frame drawing rate.

13. The first electronic device according to claim 10, wherein the first electronic device comprises a system on chip (SOC) and a screen IC, and the adjusting, by the first electronic device, the refresh rate of the screen from the first refresh rate to the second refresh rate comprises:

sending, by the SOC, a first refresh rate adjustment notification to the screen IC, wherein the first refresh rate adjustment notification comprises the second refresh rate;

receiving, by the screen IC, the first refresh rate adjust-ment notification, and adjusting the refresh rate of the screen image from the first refresh rate to the second refresh rate based on the first refresh rate adjustment notification;

sending, by the SOC, a working mode adjustment noti-fication to the screen IC, wherein the working mode adjustment notification is used to indicate the screen IC to adjust the working mode of the screen to the AOD mode; and receiving, by the screen IC, the working mode adjustment notification, and adjusting the working mode of the screen to the AOD mode based on the working mode adjustment notification.

\* \* \* \* \*